United States Patent
Lin et al.

(10) Patent No.: US 10,440,299 B2
(45) Date of Patent: Oct. 8, 2019

(54) CORRECTING PIXEL DEFECTS BASED ON DEFECT HISTORY IN AN IMAGE PROCESSING PIPELINE

(71) Applicant: Apple Inc., Cupertino, CA (US)

(72) Inventors: Sheng Lin, San Jose, CA (US); D. Amnon Silverstein, Palo Alto, CA (US); David R. Pope, Fremont, CA (US); Suk Hwan Lim, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 127 days.

(21) Appl. No.: 14/845,659

(22) Filed: Sep. 4, 2015

(65) Prior Publication Data

US 2017/0070692 A1    Mar. 9, 2017

(51) Int. Cl.

| | |
|---|---|
| *H04N 5/367* | (2011.01) |
| *H04N 5/217* | (2011.01) |
| *H04N 1/409* | (2006.01) |
| *G06T 5/00* | (2006.01) |

(52) U.S. Cl.
CPC ......... *H04N 5/3675* (2013.01); *H04N 5/2176* (2013.01)

(58) Field of Classification Search
CPC .... H04N 5/2176; H04N 5/2178; H04N 5/367; H04N 5/3675; H04N 1/4097; G06T 5/005
USPC ......... 348/246, 247; 382/149, 254, 255, 275
See application file for complete search history.

(56) References Cited

U.S. PATENT DOCUMENTS

| | | | | |
|---|---|---|---|---|
| 5,694,228 A | * | 12/1997 | Peairs | H04N 1/4097 358/448 |
| 6,035,072 A | * | 3/2000 | Read | G06K 9/40 348/241 |
| 7,009,644 B1 | * | 3/2006 | Sanchez | H04N 5/2173 348/243 |
| 7,593,569 B2 | * | 9/2009 | Sakurai | G06K 9/00 382/167 |
| 7,929,032 B2 | | 4/2011 | Tajima et al. | |
| 7,944,488 B2 | * | 5/2011 | Post | H04N 9/64 348/246 |
| 8,508,612 B2 | | 8/2013 | Cote et al. | |
| 8,593,483 B2 | | 11/2013 | Cote et al. | |
| 8,620,102 B2 | | 12/2013 | Hunter | |
| 8,736,721 B2 | | 5/2014 | Park et al. | |
| 8,786,625 B2 | | 7/2014 | Cote et al. | |

(Continued)

*Primary Examiner* — Marly S Camargo
(74) *Attorney, Agent, or Firm* — Robert C. Kowert; Meyertons, Hood, Kivlin, Kowert & Goetzel, P.C.

(57) ABSTRACT

An image signal processor may include a pixel defect correction component that tracks defect history for frames captured by an image sensor and applies the history when identifying and correcting defective pixels in a frame. The component maintains a defect pixel location table that includes a defect confidence value for pixels of the image sensor. The component identifies defective pixels in a frame, for example by comparing each pixel's value to the values of its neighbor pixels. If a pixel is detected as defective, its defect confidence value may be incremented. Otherwise, the value may be decremented. If a pixel's defect confidence value is over a defect confidence threshold, the pixel is considered defective and thus may be corrected. If a pixel's defect confidence value is under the threshold, the pixel is considered not defective and thus may not be corrected even if the pixel was detected as defective.

20 Claims, 12 Drawing Sheets

(56) References Cited

U.S. PATENT DOCUMENTS

| | | | |
|---|---|---|---|
| 9,100,635 B2* | 8/2015 | Duparre | H04N 9/64 348/246 |
| 9,432,601 B2* | 8/2016 | Sei | G06K 9/38 382/270 |
| 2003/0146975 A1* | 8/2003 | Joung | H04N 5/3675 348/164 |
| 2006/0012695 A1* | 1/2006 | Chang | H04N 9/64 348/246 |
| 2006/0125939 A1* | 6/2006 | Yoneda | H04N 5/3675 348/246 |
| 2008/0117318 A1* | 5/2008 | Aoki | H04N 5/367 348/246 |
| 2008/0218610 A1* | 9/2008 | Chapman | H04N 9/64 348/246 |
| 2008/0266429 A1* | 10/2008 | Noraz | H04N 5/3675 348/247 |
| 2009/0195677 A1 | 8/2009 | Noh | |
| 2010/0141810 A1* | 6/2010 | Wang | H04N 5/3675 348/246 |
| 2010/0215266 A1* | 8/2010 | Higuchi | G06K 9/64 382/167 |
| 2011/0090380 A1* | 4/2011 | Cote | G06T 3/4015 348/246 |
| 2013/0265295 A1* | 10/2013 | Ogawa | G09G 5/003 345/214 |
| 2014/0192236 A1* | 7/2014 | Kolli | H04N 5/3675 348/246 |
| 2014/0307129 A1 | 10/2014 | Feng | |
| 2015/0029364 A1 | 1/2015 | Kolli | |
| 2015/0062400 A1* | 3/2015 | Kawai | H04N 5/23212 348/302 |
| 2015/0071564 A1* | 3/2015 | Sasaki | H04N 5/3675 382/275 |

\* cited by examiner

| P0 | P1 | P2 |
|---|---|---|
| P3 | P (center or current pixel) | P4 |
| P5 | P6 | P7 |

*FIG. 11*

CORRECTING PIXEL DEFECTS BASED ON DEFECT HISTORY IN AN IMAGE PROCESSING PIPELINE

BACKGROUND

Image data captured by an image sensor is often initially processed as part of an image processing pipeline in order to prepare the captured image data for further processing or consumption. In this way, real-time corrections or enhancements can be made without consuming other system resources. For example, raw image data may be corrected, filtered, or otherwise modified to provide subsequent components, such as a video encoder, with appropriately scaled image data for encoding and subsequent display, reducing a number of subsequent operations to be performed on the image data at the video encoder.

In order to implement these corrections or enhancements for captured image data, various different devices, components, units, or other modules may be used to implement the varying operations performed as part of an image processing pipeline. An image signal processor, for instance, may include multiple different units or stages at which different image modifications or enhancements can be made to image data obtained from an image sensor. Given the ubiquity of image sensors in many different products, efficiently handling image data as part of an image processing pipeline may confer relief on those products with constrained resources for performing additional tasks.

SUMMARY

An image signal processor (ISP) of a device, apparatus, or computing system that includes a camera or other image sensor capable of capturing image data may include an image signal processor (ISP) pipeline that may implement one or more stages that process image data obtained from an image sensor of a camera via a sensor interface of the ISP. In some embodiments, the ISP may include a pixel defect correction stage or component that may receive raw pixel data, for example from a sensor interface of the ISP, and perform detection and correction of defective pixels in the frame. Conventionally, defective pixels are identified either by a static defect table for the image sensor that identifies known defective pixels on the sensor, for example defective pixels determined by a calibration process at the factory, or are determined by dynamically identifying defective pixels in the current frame being processed. In addition, patterned defect pixels, if present, are considered defective and are also corrected.

In embodiments, instead of simply relying on a static defect table and the current frame to determine defective pixels in a current frame being processed by the image processing pipeline, the pixel defect correction component tracks defect history for the image sensor and applies the defect history when identifying defective pixels in a frame. In some embodiments, the pixel defect correction component maintains a defect pixel location table that includes a defect confidence value for pixels of the image sensor, including patterned defect pixels if present. The pixel defect correction component dynamically identifies defective pixels in each frame processed by the component, for example by comparing each pixel's value to the values of its neighbor pixels. If a pixel is dynamically detected as defective in a frame, its defect confidence value may be incremented in the defect pixel location table. Otherwise, if the pixel is detected as not being defective, the defect confidence value may be decremented for the pixel. In some embodiments, if a pixel's defect confidence value in the table is equal to or greater than a defect confidence threshold, the pixel defect correction component may consider the pixel defective and may thus apply a correction technique (e.g., a weighted combination of two or more neighboring pixels) to the pixel even if the pixel is not dynamically detected as defective. If a pixel's defect confidence value in the table is under the defect confidence threshold, the pixel defect correction component may consider the pixel not defective and thus may not correct the pixel even if the pixel is detected as defective by the dynamic defect detection technique.

Dynamic pixel detection and correction as described herein may be performed for the pixels of each frame captured by an image sensor, or alternatively may only be performed for some of the frames. The defect pixel location table is updated when dynamic pixel detection and correction is applied to a frame, and the updated table is used when detecting and correcting defective pixels in at least some subsequent frames. Thus, the defect pixel location table provides a history of pixel defects over time, and indications of defective pixels can be added to or removed from the table. Thus, rather than relying on a static defect table as in conventional systems, embodiments provide a dynamic defect table that is adapted over time to the conditions of the image sensor, with pixels that become defective being detected and marked as defective in the table, and pixels marked as defective that are actually not defective being detected and removed or marked as not defective in the table.

BRIEF DESCRIPTION OF THE DRAWINGS

FIG. 11 illustrates neighbor pixels for a current pixel P that may be used in a dynamic defect detection technique, according to some embodiments.

Figure 1:
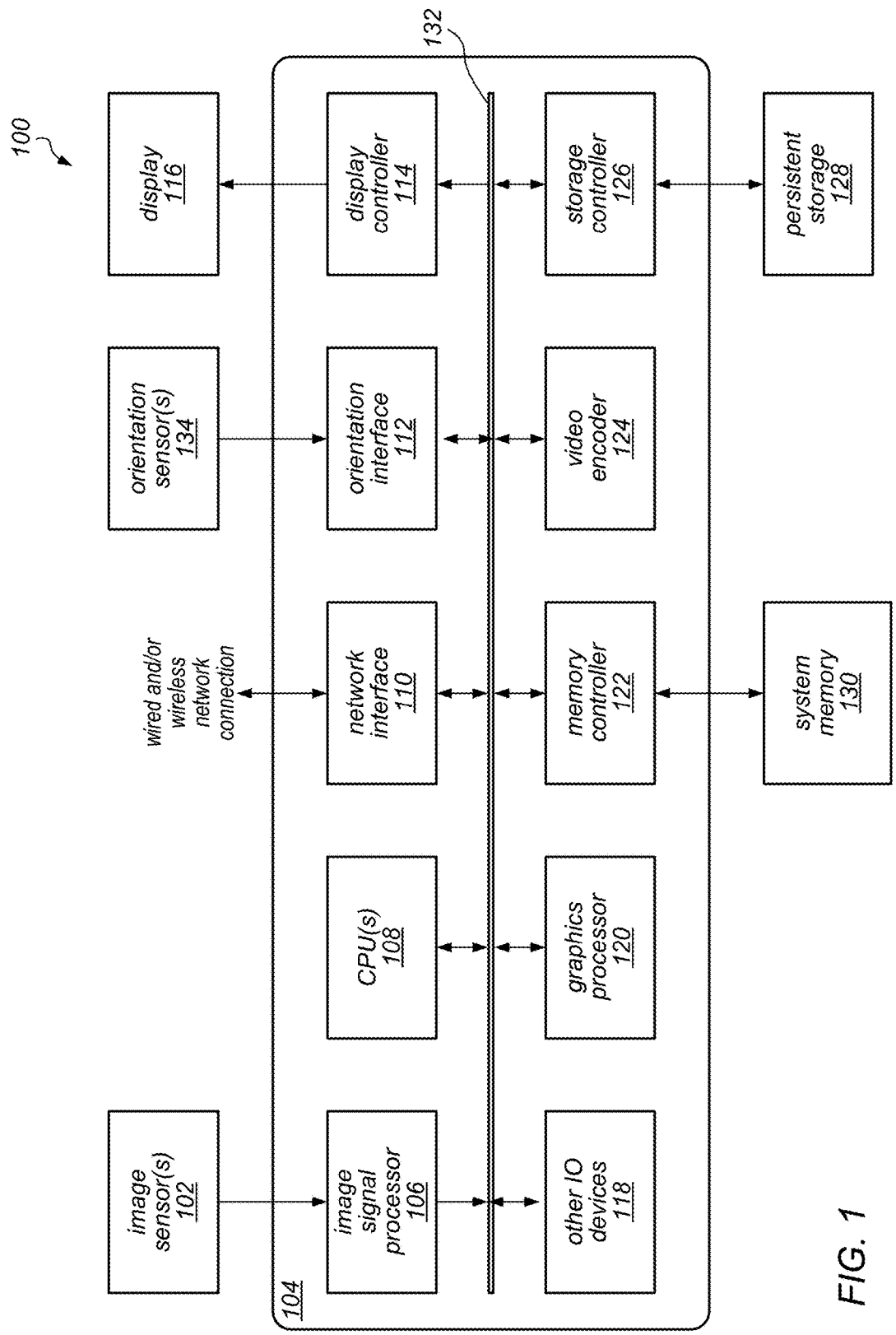
FIG. 1 is a logical block diagram illustrating an example system that may implement an image processing pipeline that processes image data at multiple rates, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

When used in the claims, the term "or" is used as an inclusive or and not as an exclusive or. For example, the phrase "at least one of x, y, or z" means any one of x, y, and z, as well as any combination thereof.

DETAILED DESCRIPTION

An image signal processor or other image processing pipeline may implement many different techniques or components to correct or enhance image data captured by an image sensor. However, image data captured by the image data is not always utilized for the same purposes. For example, an image sensor may provide a stream of image data in order to display a preview image of what may be captured by the image sensor in higher resolution still image or recorded in a video. Depending on the desired effects or formats according to which image data captured by the image sensor may be processed, different portions of an image processing pipeline that processes the image data may be over or under-utilized. For example, for image data captured by a high-resolution image sensor that is being recorded as part of a lower resolution video file, some portions of an image processing pipeline may be over utilized (e.g., those portions of the pipeline processing the full-resolution image data which may be ultimately discarded in order to scale the image for the low resolution video).

In various embodiments, the image signal processor may process image data in an image processing pipeline at multiple rates in order to more efficiently leverage the processing capabilities of the image processing pipeline. For instance, in at least some embodiments one or more front-end pipeline stages may process image data at an initial rate, such as 2 pixels per clock cycle (ppc). In this way large amounts of image data (e.g., either as large individual image frames or a high rate of image frames, such as may be captured when recording slow motion video) may receive initial processing to reduce or correct image signal noise, artifacts, and other image defects that may be introduced as a result of collecting and processing image data. The image data may then be downscaled to a desired size and processed at a different rate, such as 1 ppc, at one or more back-end pipeline stages to perform other operations on the image frames in order to reduce image signal noise, correct color and image defects, as well as apply various special effects, so that processing is not performed upon image data that may be discarded.

In at least some embodiments, image data captured and processed through front-end pipeline stages may be stored in raw or full-color formats to a memory, while a scaled version of the image data may continue to be processed through the back-end pipeline stages of the image processing pipeline. In this way, high-resolution versions of image frames with some image processing may be captured while simultaneously continuing processing for lower resolution versions of the image frames (e.g., capturing high resolution stills of image frames that are also recorded in a lower resolution video).

In at least some embodiments, a back-end interface may be implemented to allow image data collected from sources different than the image sensor to be processed through back-end pipeline stage(s) of the image processing pipeline. For instance, image data received at a device that implements the image processing pipeline (e.g., a mobile computing device) from a remote device (e.g., a content server of a content provider, such as a web-based video service) may be received via the back-end interface and processed through the back-end pipeline stage(s) in order to perform operations to reduce image signal noise, correct color and image defects, or apply various special effects. In this way, the dedicated image processing components of the image processing pipeline may be utilized to efficiently perform image processing for image data received from many other sources.

The techniques described herein for processing image data in an image processing pipeline at multiple rates may be further illustrated in terms of an example system that employs them. As noted above, these techniques may be implemented in any type of camera, apparatus, or computing system that includes the capability to capture and process image data, including video clips.

One example of a system that is configured to implement any or all of the techniques described herein is illustrated in FIG. 1. For example, system 100 illustrated in FIG. 1 may be configured to perform image processing using an image signal processor without the additional system memory operations required by existing GPU and CPU approaches. In the illustrated embodiment, system 100 includes image sensor(s) 102, a system-on-a chip (SOC) component 104, system memory (e.g., DRAM) 130, persistent storage (e.g., flash memory) 128, and a display 116 (e.g., LCD or OLED). In this example, image sensor(s) 102 may be any type of image sensor suitable for capturing image data (e.g., an image sensor that is responsive to captured light), such as an active-pixel sensor (e.g., complementary metal-oxide-semiconductor (CMOS) active-pixel sensor) on a camera, video camera, or other device that includes a camera or video camera. In this example, display 116 may be configured to display a preview of captured still images or video clips (which may be provided as output from image signal processor 106). Display 116 may also be configured to display menus, selected operating parameters, or other information received from a user interface of the system (not shown). In other embodiments, other types of display devices may be included in the system for these purposes. In different embodiments, system 100 may be any of various types of devices, including, but not limited to, a personal computer system; a desktop computer; a laptop computer; a notebook, tablet, slate, or netbook computer; a mainframe computer system; a handheld computer; a workstation; a network computer; a camera; a set top box; a mobile device, such as a mobile phone, pager, personal data assistant (PDA), tablet device, or music player; an I/O device such as a digital camera, a scanner, a video recorder; a consumer device; a video game console; a handheld video game device; or in general any type of computing or electronic device that includes the functionality of a camera or video camera.

In this example, the SOC component 104 includes an image signal processor (ISP) 106, a central processor unit (CPU) 108, a network interface 110, orientation interface 112 (which may be coupled to orientation sensor(s) 134 from which system 100 orientation data, such as motion data, may be gathered), a display controller 114 (which may be coupled to and control the operations of display 116), a graphics processor (GPU) 120, memory controller 122 (which is coupled to system memory 130), a video encoder 124, a storage controller 126 (which is coupled to and controls access to persistent storage 128, such as flash memory or other non-volatile random access memory), and various other I/O devices (shown as 118), any or all of which may communicate with each other over interconnect 132. In some embodiments, system 100 or SOC component 104 may include more or fewer elements than those shown in FIG. 1.

In various embodiments, SOC component 104 may be a uniprocessor system including one processor, or a multiprocessor system including several processors or several processing cores (e.g., two, four, eight, or another suitable number). CPU(s) 108 may implement any suitable instruction set architecture, and may be configured to execute instructions defined in that instruction set architecture. For example, in various embodiments CPU(s) 108 may be general-purpose or embedded processors implementing any of a variety of instruction set architectures (ISAs), such as the x86, PowerPC, SPARC, RISC, ARM™ or MIPS ISAs, or any other suitable ISA. In multiprocessor systems, each of CPU(s) 108 may commonly, but not necessarily, implement the same ISA. CPU 108 may employ any microarchitecture, including scalar, superscalar, pipelined, superpipelined, out of order, in order, speculative, non-speculative, etc., or combinations thereof. CPU 108 may include circuitry to implement microcoding techniques. CPU 108 may include one or more processing cores each configured to execute instructions. CPU 108 may include one or more levels of caches, which may employ any size and any configuration (set associative, direct mapped, etc.).

In the example illustrated in FIG. 1, system memory 130 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit implementing system 100 in a chip-on-chip configuration, a package-on-package configuration, or a multi-chip module configuration. In some embodiments, system memory 130 may store pixel data or other image data or statistics in various formats. Similarly, while the example system 100 illustrated in FIG. 1 includes persistent storage 128 for non-volatile storage of image data or other data used in the system, in other embodiments, the system may include other types of non-volatile memory (e.g. ROM) for those purposes.

Graphics processing unit (GPU) 120 may include any suitable graphics processing circuitry. Generally, GPU 120 may be configured to render objects to be displayed into a frame buffer (e.g., one that includes pixel data for an entire frame). GPU 120 may include one or more graphics processors that may execute graphics software to perform a part or all of the graphics operation, or hardware acceleration of certain graphics operations. The amount of hardware acceleration and software implementation may vary from embodiment to embodiment.

I/O devices 118 may include any desired circuitry, depending on the type of system 100. For example, in one embodiment, system 100 may be a mobile computing device (e.g. personal digital assistant (PDA), tablet device, smart phone, etc.) and the I/O devices 118 may include devices for various types of wireless communication, such as WiFi, Bluetooth, cellular, global positioning system, etc. In some embodiments, I/O devices 118 may also include additional storage, including RAM storage, solid state storage, or disk storage. In some embodiments, I/O devices 118 may include user interface devices such as additional display devices, including touch display screens or multi-touch display screens, keyboards, keypads, touchpads, scanning devices, voice or optical recognition devices, microphones, speakers, scanners, printing devices, or any other devices suitable for entering or accessing data by or within system 100.

In this example, image signal processor (ISP) 106 may include dedicated hardware that may facilitate the performance of various stages of an image processing pipeline, as described in detail herein. In some embodiments, ISP 106 may be configured to receive image data from image sensor 102, and to the process the data into a form that is usable by other components of system 100 (including display 116 or video encoder 124). In some embodiments, ISP 106 may be configured to perform various image-manipulation operations such as image translation operations, horizontal and vertical scaling, color space conversion or other non-warping image editing operations, or image stabilization transformations, as described herein. One embodiment of an image signal processor is illustrated in more detail in FIG. 3 and described below.

In the example illustrated in FIG. 1, interconnect 132 may be configured to facilitate communications between the various functional units included in SOC 104. In various embodiments, interconnect 132 may include any suitable interconnect circuitry such as meshes, network on a chip fabrics, shared buses, point-to-point interconnects, etc. In some embodiments, interconnect 132 may perform any necessary protocol, timing or other data transformations to convert data signals from one component (e.g., system memory 130) into a format suitable for use by another component (e.g., CPU(s) 108 or GPU 120). In some embodiments, interconnect 132 may include support for devices attached through various types of peripheral buses, such as a variant of the Peripheral Component Interconnect (PCI) bus standard or the Universal Serial Bus (USB) standard, for example. In some embodiments, the function of interconnect 132 may be split into two or more separate components, such as a north bridge and a south bridge, for example. In some embodiments, interconnect 132 may facilitate the communication of pixel data or other image data or statistics to various functional units in the appropriate formats.

In this example, network interface 110 may be configured to allow data to be exchanged between system 100 and other devices attached to one or more networks (e.g., carrier or agent devices) or between nodes or components of system 100. For example, video or other image data may be received from other devices (e.g., a content provider network or another mobile computing device) via network interface 110 and be stored in system memory 130 for subsequent processing (e.g., via a back-end interface to image signal processor 106, such as discussed below in FIG. 3) and display. The network(s) may in various embodiments include, but are not limited to, Local Area Networks (LANs) (e.g., an Ethernet or corporate network), Wide Area Networks (WANs) (e.g., the Internet), wireless data networks, some other electronic data network, or some combination thereof. In various embodiments, network interface 110 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network or protocol.

Those skilled in the art will appreciate that system 100 is merely illustrative and is not intended to limit the scope of embodiments. For example, system 100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available. In some embodiments program instructions stored in system memory 130 may be executed by CPU 108 or GPU 120 to provide various functions of system 100.

In other embodiments, various functions may be performed by software components executing in memory on another device and communicating with the illustrated system via inter-computer communication. Some or all of these software components or any data structures described herein may be stored (e.g., as instructions or structured data) in system memory 130, in persistent storage 128, or may be stored on a non-transitory computer-readable medium or a portable article to be read by an appropriate drive. In some embodiments, instructions stored on a computer-accessible medium separate from system 100 may be transmitted to system 100 via transmission media or signals such as electrical, electromagnetic, or digital signals, conveyed via a communication medium such as a network or a wireless link. Various embodiments may further include receiving, sending or storing instructions or data implemented in accordance with the descriptions herein. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc.

Figure 2:
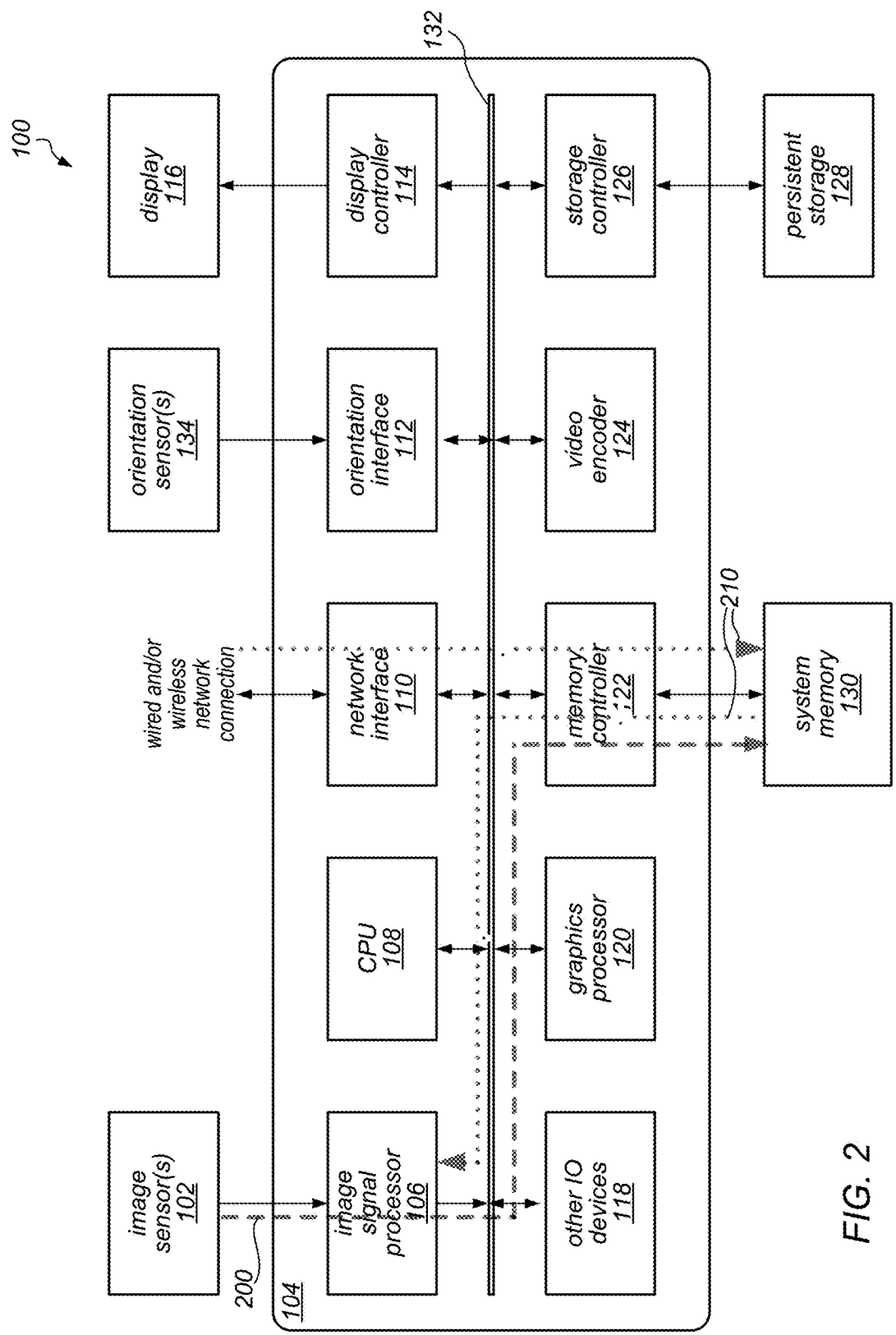
FIG. 2 is a logical block diagram illustrating example data paths in a system that may implement an image processing pipeline that processes image data at multiple rates, according to some embodiments.

FIG. 2 is a block diagram illustrating data paths in a system that implements an image signal processor (specifically, in system 100 illustrated in FIG. 1), according to some embodiments. As illustrated by the dashed lines in one example, image data may pass from the image sensor (102), through the image signal processor (106) to system memory 130 (by way of interconnect 132 and memory controller 122). Once the image data has been stored in system memory 130, it may be accessed by video encoder 124, display 116 (e.g., by way of interconnect 132 and, in the case of display 116, display controller 114). For example, it may be accessed by display controller 114 in order to display a preview on display 116, or may be accessed by video encoder 124, which may encode the data in a format suitable for video recording to persistent storage 128 (e.g., for storage), or for passing the data to network interface 110 for transmission over a network (e.g., for a video conference) or elsewhere, in various embodiments.

Another example data path is illustrated by the dotted lines 210. Image data, such as video image or data or image stills or frames, may be received system 100 from sources other than the image sensor(s) 102. For example, video data may be streamed, downloaded, or otherwise communicated to the system 100 via wired or wireless network connections from other sources remote to system 100 (e.g., a content provider network or other mobile computing device). The image data may be received via network interface 110 and written to memory 130 via memory controller 122. The image data may then be obtained by image signal processor 106 from memory 130 and processed through one or more image processing pipeline stages, in some embodiments, to perform various image correction, translation, conversion, or other image processing techniques. The image data may then be returned to memory 130, video encoder 124, or other component such as display controller 113 for display at display 116 or to storage controller 126 for storage at persistent storage 128 (not illustrated).

In some embodiments graphics processor 120 may access, manipulate, transform or otherwise process image data, and thus additional read and write operations may be performed on system memory 130 beyond those illustrated in FIG. 2. Image data that is stored in system memory 130 may be accessed by GPU 120 (by way of interconnect 132 and memory controller 122), and, after GPU 120 has performed one or more image transformations on the image data, the image data may be written back to system memory 130 (again, by way of interconnect 132 and memory controller 122). Similar data paths may be employed in system 100 between system memory 130 and CPU 108 if image processing is instead performed by CPU 108 (e.g., by software executing on CPU 108). In some embodiments (though not illustrated) image data out from image signal processor 106 may be sent directly (via interconnect 132) to another functional component (e.g., CPU 120, graphics processor 120, other I/O devices 118, network interface 110, video encoder 124, storage controller 126, or display controller 114) without storing the image data to system memory 130. In One embodiment of an image signal processing unit (ISP), such as image signal processor 106, is illustrated by the block diagram in FIG. 3. As illustrated in this example, ISP 106 may in various embodiments be coupled to image sensor(s) 102 (from which it receives image data). In this example, ISP 106 implements an image processing pipeline which may include a set of stages that process image information from creation, capture, or receipt to output. For example, the various elements illustrated as components of ISP 106 process source data received from image sensor 102 through sensor interface(s) 302 into image data processable by other stages in the pipeline (e.g., image statistics 304, raw image processing 306, resample processing stage 308, noise processing stage 310, color processing stage 312, or output rescale 314), by other components of a system that includes ISP 106 via output interface 316 (including those that access the transformed data from the system memory after it is written to the system memory via memory controller interface 122 or are provided the image data via interconnect 132 directly) or back-end interface 342, or by other devices coupled to the system that includes ISP 106. In at least some embodiments, sensor interface(s) 302 may perform various preprocessing operations on raw pixel data received from the image sensor 102, such as pixel replication to convert the raw pixel data to 16-bit raw pixel data, pixel defect preprocessing for the raw pixel data to adjust values of patterned defects and defect line pairs (e.g., created by special pixels like focus pixels), image cropping to reduce image data size, pixel binning, and/or horizontal pixel scaling. Note that in some embodiments, the image signal processor 106 is a streaming device. In other words, pixels may be received by the image signal processor 106 from the image sensor 102 via sensor interface(s) 302 in raster order (i.e., horizontally, line by line) and may in general be processed through its various pipeline stages in raster order, until finally being output in raster order.

Image signal processor 106 may process image data received at image signal processor (sometimes referred to as an ISP) at different rates. For example, in the example embodiment illustrated in FIG. 3, image signal processor may implement one or more front-end pipeline stages 330, such as raw processing stage 306 and resample processing stage 308, which process image data at an initial rate. Thus, the various different techniques, adjustments, modifications, or other processing operations performed at these front-end pipeline stages (such as those described below with respect to raw processing stage 306 and resample processing stage 308) may be implemented so that the image data may be continuously processed through these stages at the initial rate. For example, if the front-end pipeline stages 330 process 2 pixels per clock cycle, then raw processing stage 306 operations like black level compensation, highlight recovery, defective pixel correction, and others, may process 2 pixels of image data at a time.

Figure 3:
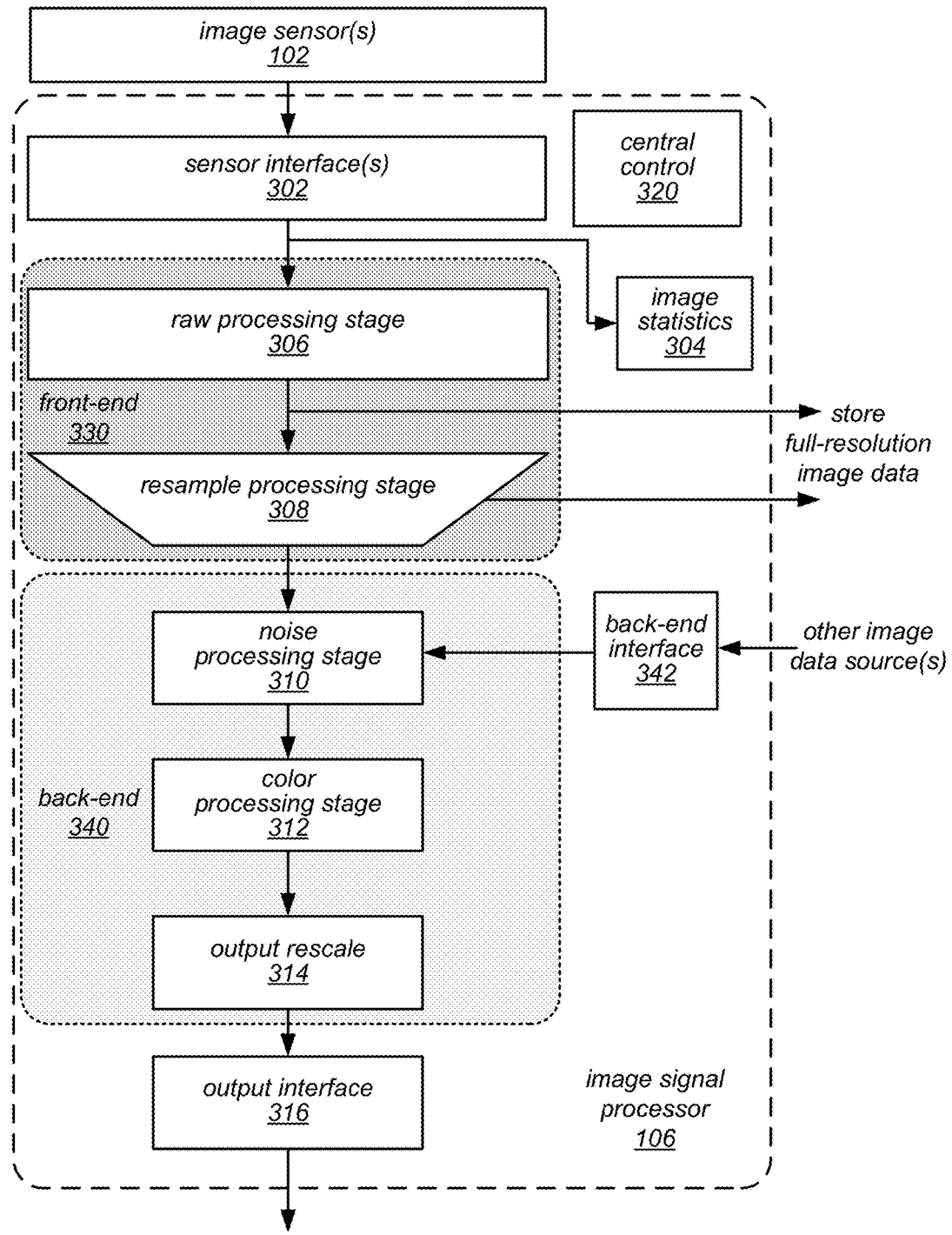
FIG. 3 is a logical block diagram illustrating an example image signal processor, according to some embodiments.

In addition to processing the image data at front-end pipeline stages at an initial rate, image signal processor 106 may implement one or more back-end pipeline stages that process image data a different rate. The back-end pipeline stages 340 may, in various embodiments, process image data at a reduced rate that is less than the initial data rate. For example, as illustrated in FIG. 3, back-end pipeline stages 340, such as noise processing stage 310, color processing stage 312, and output rescale 314, may be implemented so that the image data is processed according to the reduced rate. Given the above example of front-end stages 330 processing image data at 2 ppc, then noise processing stage 310 may implement operations such as temporal filtering and luma sharpening to process image data at a rate less than 2 ppc, such as 1 ppc.

In at least some embodiments, image signal processor 106 may implement back-end interface 342. Back-end interface 342 may receive image data from other image sources than image sensor(s) 102. For instance, as illustrated in FIG. 2, image data received over a wireless connection may be received and stored in memory 130. The image data may be received through back-end interface 342 for processing at back-end stages 340 of image signal processor 106. In this way, image signal processor 106 can be configured to provide resource efficient image processing capacity to data received from other image data source(s) instead of (or in addition to) CPU or GPU processing performed on the image data. In various embodiments, back-end interface 342 may convert image data to a format that is utilized by back-end processing stages. For instance, back-end interface 342 may convert RGB, YCbCr 4:2:0, or YCbCr 4:2:2 formatted image data into YCbCr 4:4:4 color format. In some embodiments, the back-end interface 342 may convert from various color formats, and thus the previous examples are not intended to be limiting. (Note that YCbCr formats may also be referred to as YCC formats).

In various embodiments, image signal processor 106 may implement central control module 320. Central control module 320 may configure and start the processing of image data, in some embodiments. For example, central control module 320 may implement performance monitors for logging clock cycles, memory latency, quality of service, and state information. Central control module 320 may update or manage control parameters for units, modules, stages, or other components of ISP 106, and may interface with sensor interface 302 to control the starting and stopping of the units, modules, stages, or other components. For example, in some embodiments, a unit, module, stage, or other component may go into an idle state during which programmable parameters may be updated by central control module 320. The unit, module, stage, or other component may then be placed into a run state, to perform one or more operations or tasks. In other examples, central control module 320 may configure image signal processor 106 to store image data (e.g., to be written to a memory, such as memory 130 in FIG. 2) before, during, or after resample processing stage 308. In this way full-resolution image data whether in raw or full-color domain format may be stored in addition to or instead of processing the image data output from resample processing stage 308 through backend pipeline stages.

In various embodiments, image signal processor 106 may implement image statistics module(s) 304. Image statistics module(s) 304 may perform various functions and collect information. For example image statistics module may, in some embodiments may perform sensor linearization, defective pixel replacement, black level compensation, lens shading correction, and inverse black level compensation in order to collect image information as a result of the various operations. Other statistics, such as 3A statistics (Auto white balance (AWB), auto exposure (AE), auto focus (AF)), histograms (e.g., 2D color or component), or any other image data information may be collected or tracked. Thus, the previous examples are not intended to be limiting. In some embodiments, certain pixels values, or areas of pixel values may be excluded from statistics collections, such as from AF statistics, when the statistics operations like sensor linearization, defective pixel replacement, black level compensation, lens shading correction, and inverse black level compensation identify clipped pixels. In scenarios where multiple image statistics modules 304 are implemented, each statistic module may be programmed by central control module 320 to collect different information for the same image data, or different image data collected for different images (e.g., collected from different ones of image sensor(s) 102).

As noted above, image signal processor 106 may implement one or multiple front-end pipeline stages, such as raw processing stage 306 and resample processing stage 308, which may process image data in raw or full-color domains. Raw processing stage 306 may, in various embodiments implement a variety of modules, units, or components to perform various operations, functions, or tasks on raw image data. Bayer raw format, for example, may be image data from collected from image sensor(s) 102 that implement a Bayer pattern of pixel sensors. For instance, some pixel sensors only capture green light, while other sensors capture red or blue light in Bayer pattern of sensors. In this way, image data in Bayer raw image format (or other raw image format captured by a color filter array in an image sensor) provides pixel data with values specific to a particular color (instead of all colors).

Raw processing stage 306 may thus process image data in a raw format (such as Bayer raw format) applying various operations including, but not limited to, sensor linearization, black level compensation, fixed pattern noise reduction, defective pixel correction, raw noise filtering, lens shading correction, white balance gain, and highlight recovery. A sensor linearization unit may, in some embodiments, map non-linear image data to linear space for other processing (e.g., to convert image data from a compounding format collected from a High Dynamic Range (HDR) image sensor which may be one of image sensor(s) 102). Black level compensation may, in some embodiments, be performed to provide digital gain, offset and clip independently for each color component (e.g., Gr,R,B,Gb) on the pixels image data (which may occur after sensor linearization). In some embodiments, fixed pattern noise reduction may be performed to remove offset fixed pattern noise and gain fixed pattern noise by subtracting a dark frame from an input image and multiplying different gains to pixels, in some embodiments. Defective pixel correction may determine or identify defective pixels, and may replace defective pixel values, in various embodiments. Raw noise filtering may reduce noise of image data, in various embodiments, by averaging neighbor pixels that are similar in brightness. Highlight recovery may, in various embodiments, estimate pixel values for those pixels that are clipped (or nearly clipped) from other channels. Lens shading correction may apply a gain per pixel to compensate for a dropoff in intensity roughly proportional to a distance from a lens optical center. White balance gains may provide digital gains for white balance, offset and clip independently for all color components (e.g., Gr,R,B,Gb in Bayer format). Please note that various examples and descriptions provided above are not intended to be limiting as to the various techniques, components, or formats of raw processing stage 306 but are instead merely provided as examples. Various components, units, or modules may be broken apart into multiple different pipeline processing stages. Also note that in some embodiments, various ones of the components, units, or modules may convert raw image data into full-color domain, and thus raw processing stage 306 may, at various portions, process image data in the full-color domain in addition to or instead of raw image data. For instance, a simple demosaic unit may receive data from raw noise filtering and interpolate a full-color domain for raw image data to perform lens shading correction, white balance gain, or highlight recovery before converting the image data back to a raw image format.

In various embodiments, image signal processor 106 may implement resample processing stage 308. Resample processing stage 308 may perform various operations to convert, resample, or scale image data received from raw processing stage 306, and may provide as output image data according to a reduced rate such as may be implemented a back-end pipeline stages 340. Please note, that in some embodiments, some or all of the portions of resample processing stage may be implemented as part of raw processing stage and thus the previous description is provided as an example pipeline stages in an image processing pipeline which may implement multi-rate processing for image data.

In various embodiments, image signal processor 106 may implement one or more back-end pipeline stages 340 to process image data at rate that is less than the initial rate for processing image data in front-end stages 330 (e.g., 4 ppc initial rate >3, 2, or 1 ppc reduced rate). In at least some embodiments, back-end pipeline stages 340 may process image data according to a particular full-color format (e.g., YCbCr 4:4:4 or RGB) in which resample processing stage 308 or back-end interface 342 may provide to back-end stages 340. Please note, that in some embodiments, various ones of the back-end stages 340 may be configured to convert image data to the particular full-color format (or may utilize different full-color formats for processing), and thus the previous example is not intended to be limiting.

Image signal processor 106 may implement noise processing stage 310, in some embodiments. Noise processing stage 310 may, in various embodiments implement a variety of modules, units, or components to perform various operations, functions, or tasks, in different orders, such as gamma/de-gamma mapping, color space conversion, temporal filtering, noise filtering, luma sharpening, and chroma noise reduction. Color space conversion may convert image data to another color format or space (e.g., RBG to YCbCr). Gamma mapping may provide non-linear mapping functions for particular color channels of pixel data (e.g., Y, Cb, and Cr channels) in order to apply different image effects, including, but not limited to, black and white conversion, sepia tone conversion, negative conversion, or solarize conversion). Temporal filtering may be performed, in various embodiments, to filter image signal noise based on pixel values from a previously filtered image frame. Pixel values from the previously filtered image frame (which may be referred to herein as the reference image frame), may be combined with pixel values of a current image frame to get a best estimate of the pixel values. For example, a temporal filter may average the pixel values in the current image frame and the corresponding pixels in the reference image frame when the current image frame and the reference image frame are similar. In at least some embodiments, temporal filtering may be performed upon individual color channel values. For instance, a temporal filter may filter Y color channel values (from image data in YCbCr format) with Y color channel values in the reference frame (without filtering on other channels like Cb or Cr).

Other noise filtering, such as spatial noise filtering may be performed. In at least some embodiments, luma sharpening and chroma suppression may be performed to as part of spatial noise filtering in simultaneous or near simultaneous fashion. Luma sharpening may sharpen luma values of pixel data, in some embodiments. Chroma suppression may attenuate chroma to gray (i.e. no color), in some embodiments. The aggressiveness of noise filtering may be determined differently for different regions of an image, in some embodiments. Spatial noise filtering may be included as part of a temporal loop implementing temporal filtering as discussed above. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame). Please note that various examples and descriptions provided above are not intended to be limiting as to the various techniques or components implemented as part of noise processing stage 310, but are instead merely provided as examples.

Image signal processor 106 may implement color processing stage 312, in some embodiments. Color processing stage 312 may, in various embodiments implement a variety of modules, units, or components to perform various operations, functions, or tasks, in different orders, such as local tone mapping, gain/offset/clip, color correction, three-dimensional color lookup, gamma conversion, and color space conversion. Local tone mapping may, in some embodiments, apply spatially varying local tone curves in order to provide more control when rendering an image. For instance, a two-dimensional grid of tone curves (which may be programmed by the central control module 320) may be bilinearly interpolated such that smoothly varying tone curves are created across an image. In some embodiments, local tone mapping may apply spatially varying and intensity varying color correction matrices, which may, for example, be used to darken highlights and brighten shadows in an image. Digital gain, offset and clip may be provided for each color channel or component of image data, in some embodiments. Color correction may be implemented, in some embodiments, applying a color correction transform matrix to image data. 3D color lookup may utilize a three dimensional array of color component output values (e.g., R, G, B) to perform advanced tone mapping, color space conversions, and other color transforms, in some embodiments. Gamma conversion may be performed, mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

In various embodiments, image signal processor 106 may implement output rescale module 314. Output rescale module 314 may resample, transform and correct distortion on the fly as the ISP 160 processes image data. Output rescale module 314 may compute a fractional input coordinate for each pixel and uses this fractional coordinate to interpolate an output pixel via a polyphase resampling filter, in some embodiments. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may, in various embodiments, apply transforms to image data as it is processed at output rescale module 314. Output rescale module 314 may include horizontal and vertical scaling components. The vertical portion of the design may implement series of image data line buffers to hold the "support" needed by the vertical filter. As ISP 106 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may generate a best guess of where to center the vertical support window automatically. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 314 to various other components of system 100, as discussed above with regard to FIGS. 1 and 2.

Note also that, in various embodiments, the functionally of units 302-342 may be performed in a different order than the order implied by the order of these functional units in the image processing pipeline illustrated in FIG. 3, or may be performed by different functional units than those illustrated in FIG. 3. Moreover, the various components, units, processes, or other functionalities described in FIG. 3 (or subsequent FIGS. 4-11) may be implemented in various combinations of hardware or software.

Sensor Interface

Figure 4:
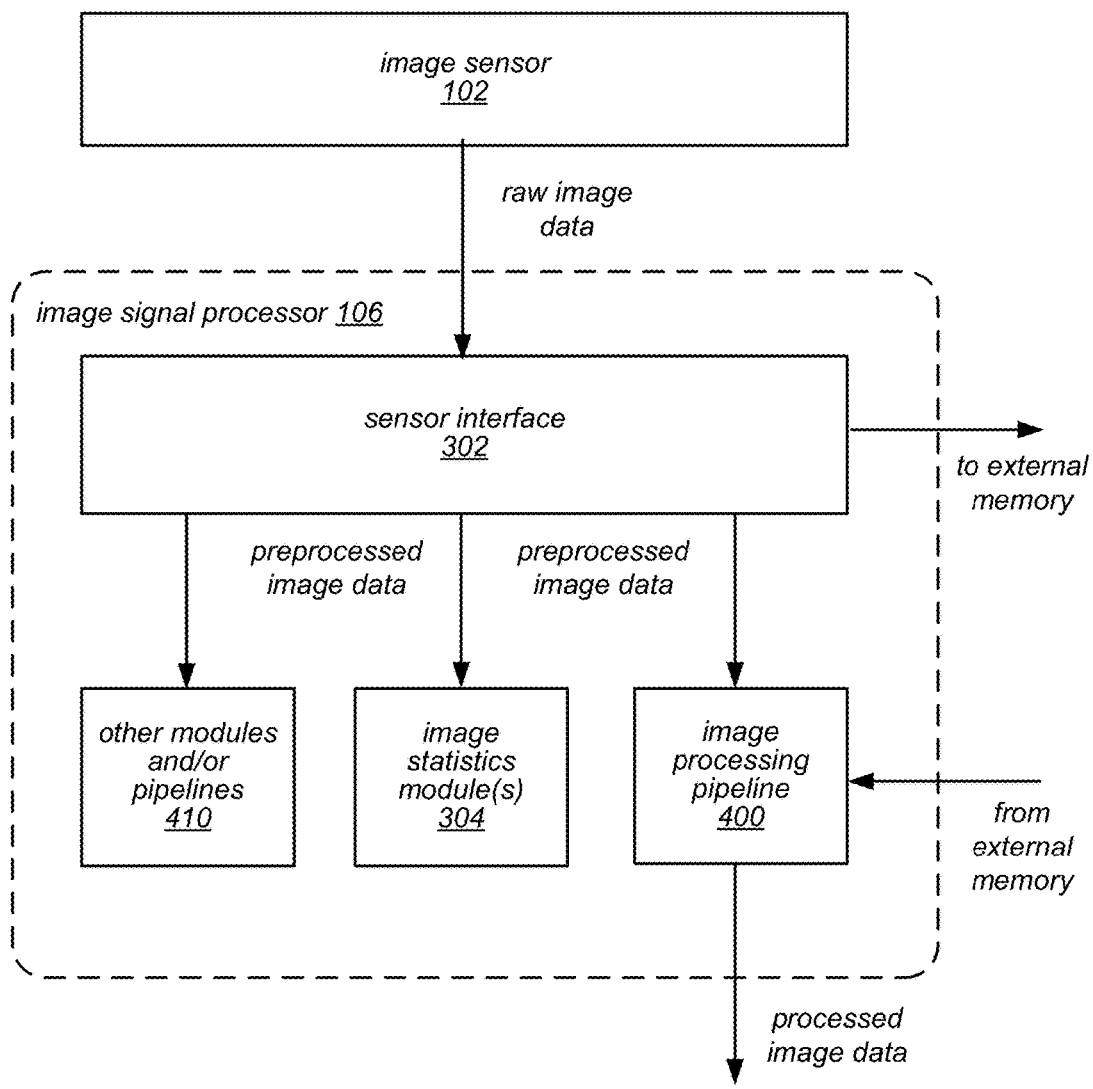
FIG. 4 is a logical block diagram illustrating operations of a sensor interface component in an image signal processor, according to some embodiments.

As shown in FIG. 3, in some embodiments, an image signal processor (ISP) 106 may include one or more sensor interfaces 302 that may be coupled to image sensor(s) 102 from which the ISP 106 receives raw image data, for example as a stream of pixels. FIG. 4 is a high-level block diagram illustrating operations of a sensor interface 302 component in an image signal processor 106, according to some embodiments. In at least some embodiments, a sensor interface 302 may perform various preprocessing operations on raw image data received from an image sensor 102 such as pixel bit shift and replication to convert the smaller bit width raw pixel data to 16-bit raw pixel data, pixel defect preprocessing for the raw pixel data to adjust values of patterned defects and defect line pairs (e.g., created by special pixels like focus pixels), image cropping to reduce image data size, pixel binning, and/or horizontal pixel scaling. A sensor interface 302 may output the preprocessed pixels to one or more downstream components of the ISP 106 such as an image processing pipeline 400 that may include a set of front-end 330 and back-end 340 stages that further process the image data, for example as described in reference to FIG. 3, and/or to one or more image statistics modules 304, for example as described in reference to FIG. 3. In some embodiments, the sensor interface 302 may also output preprocessed image data to one or more other modules and/or pipelines 410 of the ISP 106, and/or to other modules and/or pipelines of an SOC 104 as illustrated in FIG. 1. In some embodiments, the sensor interface 302 may also output preprocessed image data to an external memory, for example via direct memory access (DMA) technology.

Note that, in some embodiments, instead of or in addition to receiving image data directly from an image sensor 102, a sensor interface 302 may fetch image data from a memory, for example using DMA technology, and may perform preprocessing on the image data fetched from memory in a similar fashion as described herein for preprocessing image data received from an image sensor 102.

In some embodiments, an image sensor 102 may generate patterned defect pixels for images captured at the image sensor 102. Patterned defect pixels may include special pixels such as focus pixels used to detect phase difference for auto focus. Patterned defect pixels are intentionally captured differently than normal pixels, for example are partially blocked or shielded at the image sensor 102, and thus less light is collected at these pixels during exposure. Thus, the patterned defect pixels tend to be darker than their normal neighbor pixels.

Figure 5:
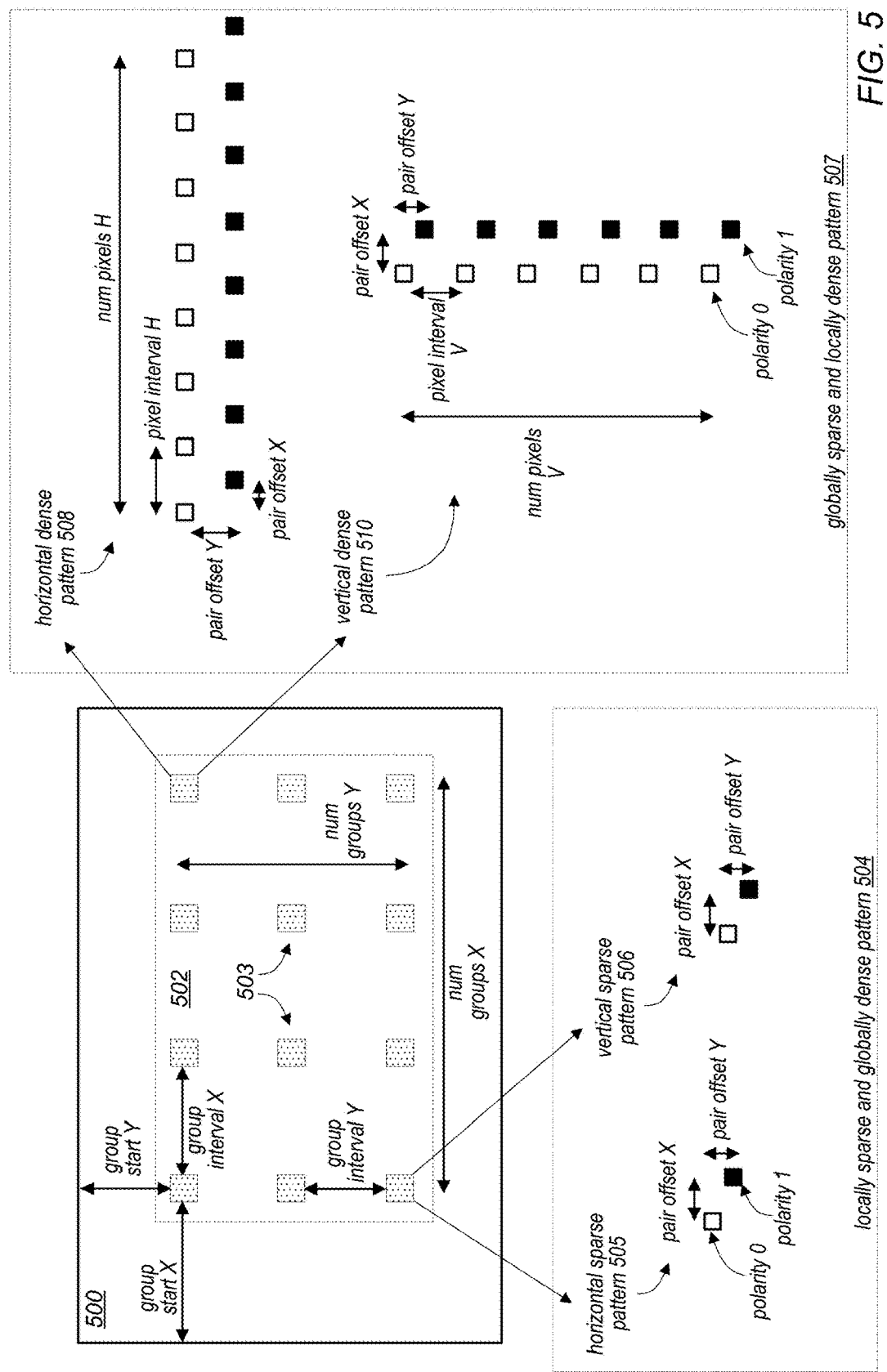
FIG. 5 provides an example of patterned defect pixels in an image frame captured by an image sensor, according to some embodiments.

FIG. 5 provides a non-limiting example of patterned defect pixels 502 in an image frame 500 captured by an image sensor 102, according to some embodiments. Patterned defect pixels 502 may include groups 503 of special pixels with known locations within the image frame 500. One type of special pixels is focus pixels. Focus pixels may, for example, be used to detect phase difference for fast auto focus. In some embodiments, a group 503 of focus pixels consists of two sets of partially blocked pixels. For focus pixels on a horizontal line, one set of focus pixels have their left side shielded and the other set right side shielded. Horizontal focus pixels may, for example, be used to detect focus on vertical edges. For focus pixels on a vertical line, one set of focus pixels have their top side shielded and the other set bottom side shielded. Vertical focus pixels may, for example, be used for detecting focus on horizontal edges. A group of horizontal left and right focus pixels can be placed on two adjacent rows. Similarly, a group of vertical top and bottom focus pixels can be placed on two adjacent columns.

In some embodiments, patterned defect pixels 502 are placed periodically throughout the image sensor 102 array on green pixels only (e.g., on (Gr, Gb) pixels in Bayer format). Patterned defect pixels 502 can be locally dense and globally sparse 507, or locally sparse and globally dense 504. As shown in FIG. 5, each square in image frame 500 represents a group 503 of patterned defect pixels 502 in a locally dense and globally sparse 507 pattern or a locally sparse and globally dense 504 pattern. In some embodiments, in a locally dense and globally sparse 507 pattern, each group 503 includes (2*num pixels) patterned defect pixels. In some embodiments, in a locally sparse and globally dense 504 pattern, each group 503 includes two patterned defect pixels. The white squares in the figure represent patterned defect pixel polarity 0, which is defined by the group start location (group start X and group start Y). The black squares represent patterned defect pixel polarity 1, which is defined by (pair offset X, pair offset Y) from the patterned defect pixel polarity 0. In some embodiments, (pair offset X, pair offset Y) are (1, 1). In some embodiments, up to four sets of patterned defect pixels can be programmed, for example one horizontal dense pattern, one vertical dense pattern, one horizontal sparse pattern and one vertical sparse pattern.

In some embodiments, one set of patterned defect pixels can overlap with another set. In some embodiments, the overlapping sets of patterned defect pixels have the same patterned defect pixel type. For example, if a pixel is identified as a type 0 patterned defect pixel in one set of patterned defect pixel parameters, it cannot be identified as a type 1 patterned defect pixel in another set of patterned defect pixel parameters. In some embodiments, in a horizontal dense pattern 508, ((num pixels H−1)*pixel interval H)<group interval X. In some embodiments, in a vertical dense pattern 510, ((num pixels V−1)*pixel interval V)<group interval Y. In some embodiments, all patterned defect pixels 502 are inside frame 500 boundaries. In some embodiments, pixel interval H, pixel interval V, group interval X, and group interval Y are even numbers. In some embodiments, if num pixels H or num pixels V is greater than 1, then the respective pixel interval is at least 2. In some embodiments, if num groups X is greater than 1, group interval X is at least 2. In some embodiments, if num groups Y is greater than 1, group interval Y is at least 2. In some embodiments, for connecting patterned defect pixels (i.e., patterned defect pixels that are adjacent to each other), the connecting patterned defect pixels should not appear in three or more consecutive rows or columns.

In some embodiments, periodically throughout the image frame 500, one of a pair of patterned defect pixels is not shielded and thus becomes a normal pixel. These pixels may be referred to as PDP-to-normal pixels. In these cases, there is only one patterned defect pixel in the 5×5 pixel neighborhood. Such single patterned defect pixels may, for example, be used for calibration. In some embodiments, the location of the PDP-to-normal pixels may be defined by a starting offset and horizontal and vertical intervals. In some embodiments, pixel defect preprocessing and/or correction is not applied to the PDP-to-normal pixels. In some embodiments, there are four sets of PDP-to-normal pixels.

Figure 6:
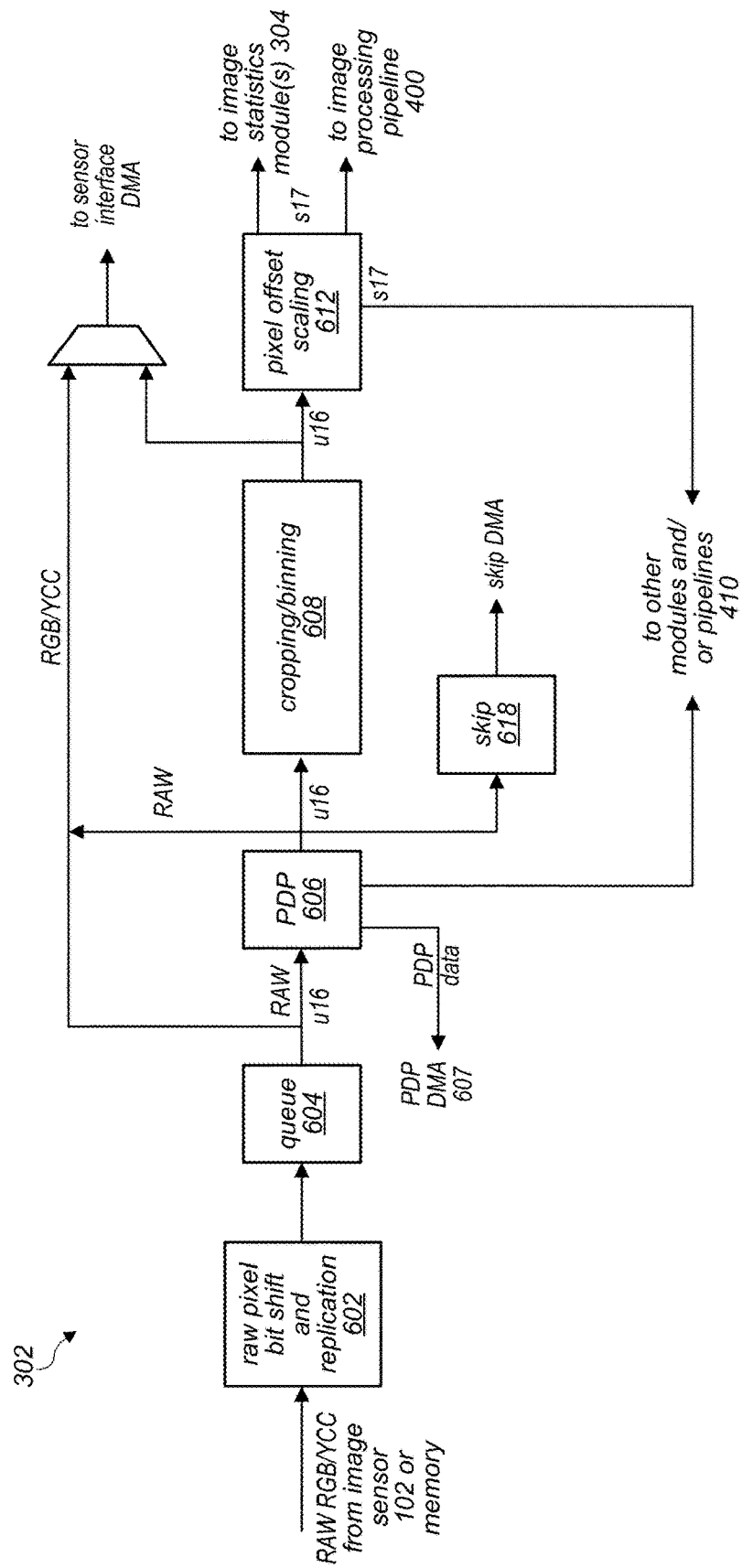
FIG. 6 is a logical block diagram illustrating components and operations of a sensor interface component in more detail, according to some embodiments.

FIG. 6 is a logical block diagram illustrating components and operations of a sensor interface 302 component in more detail, according to some embodiments. In some embodiments, a sensor interface 302 component of an ISP 106 may receive image data (e.g., in RGB or YCC format) from an image sensor 102 (or fetch image data from a memory, for example using DMA technology), perform preprocessing of the image data, and then write the preprocessed image data to memory and/or send the preprocessed image data downstream to one or more downstream components such as an ISP pipeline 400 for further processing. In some embodiments, a sensor interface 302 may include multiple stages or components. As shown in FIG. 6, in some embodiments, the sensor interface 302 may include, but is not limited to, a raw pixel bit shift and replication stage 602, a queue 604, a pixel defect preprocessing (PDP) stage 606, a cropping/binning 608 stage, and a pixel offset scaling 612 stage. In some embodiments, the cropping/binning 608 stage can perform either binning or horizontal scaling.

In some embodiments, the sensor interface 302 obtains image data from the image sensor 102 (e.g., as a stream of raw pixel data), performs preprocessing 606 of patterned defect pixels, performs optional cropping and binning or horizontal scaling at the cropping/binning 608 stage, performs pixel offset scaling 612, and writes the processed image data to memory (e.g., via sensor interface DMA)

and/or sends the processed image data to one or more downstream components such as an image statistics module 304, an image processing pipeline 400, or other modules or pipelines 410. In some embodiments, pixel offset scaling 612 converts unsigned 16-bit pixel data (u16) output from cropping/binning 608 to signed 17-bit pixel data (s17), for example by performing a bit shift and subtracting an offset. Thus, in some embodiments, the same cropped/binned/scaled pixel data output from cropping/binning 608 are sent to the sensor interface DMA and to the downstream components, the difference being that the data sent to the sensor interface DMA is in u16 format and the data sent to the downstream components in s17 format.

In some embodiments, for example, the sensor interface 302 may interface with and accept raw image data from an image sensor 102 according to MIPI-CSI (Mobile Industry Processor Interface-Camera Serial Interface) technology or other interface or transmission technologies. In some embodiments, the raw input data from the sensor 104 may be in one of RAW8, RAW10, RAW12 or RAW14 formats (where the number represents the number of bits per pixel), and may be converted to RAW16 format by raw pixel bit shift and replication 602 component. As a non-limiting example, the input image may be up to 8192 pixels wide and 8192 pixels high.

Optionally, for RAW pixel formats, horizontal scaling or 2×1 binning may be performed to reduce the horizontal width of an image, for example to reduce power consumption when processing the image data in downstream components. In some embodiments, scaling is performed only in the horizontal direction, while binning is performed in both the horizontal and vertical directions. Binning is a technique that combines signals from adjacent pixels, and may, for example, be used to provide faster readout speeds and improved signal to noise ratios, with the expense of reduced spatial resolution. In some embodiments, an active area may be used to specify which pixels from an input image are sent to downstream components. In some embodiments, for RAW8, RAW10, RAW12 or RAW14 input pixel format, raw pixel bit shift and replication 602 component may perform bit-shift and bit-replication to convert the data to RAW16 format. In some embodiments, raw pixel bit shift and replication 602 component may output the image data (e.g., in RAW16 format) to a sensor interface queue 604. From the sensor interface queue 604, the image data may be written to external memory (e.g., to a sensor interface DMA) for pixel formats including but not limited to RGB and YCC formats. In some embodiments, since raw pixel bit shift and replication 602 was performed for RAW pixel formats before sensor interface queue 604 to convert smaller bit width raw pixel data to 16-bit raw pixel data, bit replication does not need to be performed for the raw format data output from the sensor interface queue 604.

In some embodiments, the cropping/binning 608 component operates on Bayer or Quad raw pixel input. In some embodiments, cropping/binning 608 generates output in unsigned 16 bit format. In some embodiments, cropping/binning 608 has an active window specified by a starting position and ending position. Only pixels that are inside of the active window are processed. This effectively crops the input sensor data. In some embodiments, output width and height of the crop are even numbers, and are inside the input frame width and height. In some embodiments, the horizontal active region starts and ends on even columns. In some embodiments, the input to cropping/binning 608 has maximum width of 8192 at two pixels per clock, and output from cropping/binning 608 has maximum width of 4096 pixels at two pixels per clock. In some embodiments, cropping/binning may be bypassed. In some embodiments, whether cropping/binning 608 is bypassed or not, the output to the next stage is no greater than 4096 pixels wide. In these embodiments, if a line of data input to cropping/binning is larger than 4096 pixels, a combination of binning, scaling and/or cropping with the active window may be used to reduce the output to no more than 4096 pixels. In some embodiments, the width and height of the image data output from cropping/binning 608 are even numbers.

In at least some embodiments, the sensor interface 302 may include a pixel defect preprocessing (PDP) stage or component 606 that performs an initial adjustment of the pixel values for the patterned defect pixels. In some embodiments, to perform the preprocessing of the patterned defect pixels, pixel defect preprocessing 606 may apply gain to the value of each of the pixels in the pattern. Neighbor normal pixels are not affected. In some embodiments, to apply gain to a particular pixel, pixel defect preprocessing 606 may determine a gain value for the pixel from a 2D gain lookup table, e.g. a 17×17 table, for image(s) captured by the image sensor 102. In some embodiments, pixel defect preprocessing 606 may apply an interpolation technique (e.g., bilinear interpolation) to values in the table to determine a gain value for the pixel's location. The gain value may then be applied to the pixel value. In some embodiments, a pedestal or black level value may be added by the image sensor, and the pixel defect preprocessing 606 may account for the pedestal value with a pixel value offset to adjust for possible negative pixel values. The values in the gain lookup table may, for example, be determined during a calibration process for the image sensor. Alternatively, the values in the gain lookup table may be dynamically determined for the current image or for one or more previously captured image.

In some embodiments, the patterned defect pixels may be corrected at the pixel defect preprocessing (PDP) 606 stage with gain and offset as follows. Note, however, that the following method is not intended to be limiting, and that other methods may be used at the pixel defect preprocessing 606 stage to correct the patterned defect pixels. In the following, PDPin is the input pixel value for the patterned defect pixel, PDPout is the output pixel value for the patterned defect pixel, (x,y) are the patterned defect pixel location, gainLUT is the gain lookup table, and an Offset In and Offset Out may be used to correct for a pedestal or black level value that may be added by the image sensor. Interp2D is a bilinear interpolation function, an example of which is described below. The double slashes are comments:

```
// Determine the pixel value
PDPout(x,y) = (((PDPin(x,y) + Offset In) * interp2D(gain LUT, x, y) +
    128) >> 8) + Offset Out
// apply a clip to the pixel value
PDPout(x,y) = max(Clip Minimum, min(Clip Maximum, PDPout(x,y)))
```

In some embodiments, the 2D lookup table has 17×17 elements. where the horizontal and vertical samples are assumed to be on a grid form by:

(−PDPGainGridOffsetX+
    [0,int_x,2*int_x, . . . ,16*int_x])

and (−PDPGainGridOffsetY+
    [0,int_y,2*int_y, . . . ,16*int_y]), where (0,0) is the top left corner of the image. In some embodiments, int_x (gain interval x value) must be at least 2 and int_y (gain interval y value) must be at least 1. Indices to the LUT are the pixel coordinates (x, y). In some embodiments, the gain LUT has 10 bit values with 8 fractional bits.

In some embodiments, the gain for a patterned defect pixel may be determined by the interp2D function according to the following. The gain is interpolated using bilinear interpolation. Given the gains G0, G1, G2, G3, which correspond to the top-left, top-right, bottom-left, and bottom-right gains from the LUT relative to the current patterned defect pixel position, the gain may be interpolated as follows:

$$\text{Gain} = ((int\_y-jj)*(int\_x-ii)*G0 + (int\_y-jj)*ii*G1 + jj*(int\_x-ii)*G2 + ii*jj*G3)/int\_x*int\_y$$

where (int_x, int_y) are the horizontal and vertical size of the gain interval, respectively, and (ii, jj) are the horizontal and vertical pixel offset relative to the position of the top left gain G0. In some embodiments, since int_x and int_y are constant for the frame, a reciprocal value may be used to avoid the divide, for example as shown below:

$$\text{Gain} = (((int\_y-jj)*(int\_x-ii)*G0 + (int\_y-jj)*ii*G1 + jj*(int\_x-ii)*G2 + ii*jj*G3)$$

\* reciprocal value+2^(reciprocal shift−1))
\>\>reciprocal shift

In some embodiments, pixel defect preprocessing 606 may output the preprocessed pixels in the image with the values of the patterned defect pixels adjusted by the gain values to the ISP pipeline 400 for additional processing. In some embodiments, pixel defect preprocessing 606 may also output the preprocessed pixels to memory (e.g., via direct memory access (DMA) technology).

In some embodiments, pixel defect preprocessing 606 may write PDP data to an external memory through a PDP DMA 607 output channel. In some embodiments, either PDP input values or PDP output values may be selected for output through PDP DMA 607. In some embodiments, only PDP data (including PDP-to-normal pixels, but not other normal pixels) are output to PDP DMA 607. In some embodiments, PDP data is written to the external memory through PDP DMA 607 in scan order as it becomes available.

In some embodiments, pixel defect preprocessing 606 may also output the preprocessed pixels to one or more image statistics modules 304, for example image statistics module(s) 304 that generate statistics for auto exposure, white balance, or other processes. In some embodiments, pixel defect preprocessing 606 may also output the preprocessed pixels to one or more other components or processes 410. The other components or processes 410 may, for example, include an autofocus process and/or a process that detects key points in images (e.g., for use in facial recognition, computer vision, and/or image matching processes).

In some embodiments, the image signal processor 106 may include a pixel defect correction stage or component downstream of the sensor interface 302 that may receive the original pixels and/or the output pixels from the pixel defect preprocessing component 606 and perform a more rigorous correction of the patterned defect pixels than that performed by the pixel defect preprocessing component 606, as well as correction of other defective pixels in the image. In some embodiments, the pixel defect correction component may be a component of the image processing pipeline 400. Output of the pixel defect correction component may be of higher visual quality than the output of the pixel defect preprocessing component 606. However, in some embodiments, the pixel defect correction component 606 may be simpler, faster, and may take up less real estate in the ISP 106 than the pixel defect correction component. Thus, the pixel defect preprocessing component 606 may output the image data with the adjusted patterned defect pixel values for use by image statistics module(s) 304 or other modules and/or pipelines 410 that may not require the image quality provided by the pixel defect correction component. Further, the pixel defect preprocessing component 606 may allow the image statistics module(s) 304 or other modules and/or pipelines 410 to process image pixel data more quickly and substantially in parallel with the ISP pipeline 400 processing, since the other modules or pipelines do not have to wait for the output of the pixel defect correction component to process the pixel data.

Figure 7:
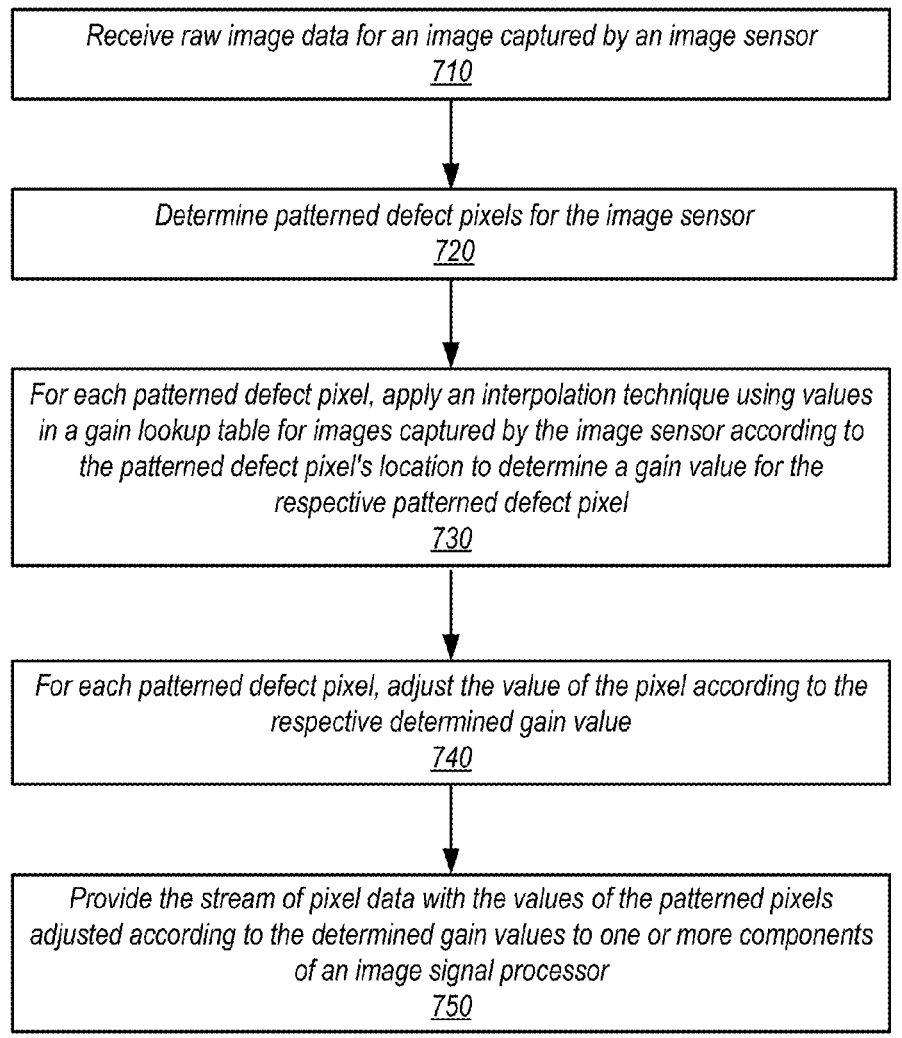
FIG. 7 is a high-level flowchart illustrating various methods and techniques for preprocessing image data in an image processing pipeline, according to some embodiments.

FIG. 7 is a high-level flowchart illustrating methods and techniques for preprocessing image data in an image signal processor, according to some embodiments. As shown in FIG. 6, in some embodiments, a sensor interface 302 of an image signal processor 106 may include a pixel defect preprocessing (PDP) stage or component 606 that performs an initial adjustment of the pixel values for patterned defect pixels, for example patterned defect pixels as shown in FIG. 5.

As indicated at 710 of FIG. 7, the sensor interface 302 may receive raw image data (e.g., as a stream of raw pixel data) for an image captured by an image sensor 102. In some embodiments, for example, the sensor interface 302 may interface with and accept raw image data from an image sensor 102 according to MIPI-CSI (Mobile Industry Processor Interface-Camera Serial Interface) technology. In some embodiments, the raw input data from the sensor 104 may be in one of RAW8, RAW10, RAW12 or RAW14 formats (where the number represents the number of bits per pixel), and may be converted to RAW16 format by a raw pixel bit shift and replication 602 component as illustrated in FIG. 6. In some embodiments, instead of or in addition to receiving image data directly from an image sensor 102, a sensor interface 302 may fetch image data from a memory, for example using DMA technology.

As indicated at 720 of FIG. 7, a pixel defect preprocessing component 606 of the sensor interface 302 may determine patterned defect pixels for the image sensor. Patterned defect pixels are intentionally captured differently than normal pixels, for example are partially blocked or shielded at the image sensor, and thus less light is collected at these pixels during exposure. Thus, the patterned defect pixels tend to be darker than their normal neighbor pixels. FIG. 5 illustrates example patterned defect pixels.

As indicated at 730 of FIG. 7, for each patterned defect pixel, the pixel defect preprocessing component 606 of the sensor interface 302 may apply an interpolation technique using values in a gain lookup table for images captured by the image sensor according to the patterned defect pixel's location to determine a gain value for the respective patterned defect pixel. In some embodiments, to apply gain to a particular pixel, the pixel defect preprocessing component 606 may determine a gain value for the pixel from a 2D gain lookup table, e.g. a 17×17 table, for image(s) captured by the image sensor 102. In some embodiments, the pixel defect preprocessing component 606 may apply an interpolation technique (e.g., bilinear interpolation) to values in the table to determine a gain value for the pixel's location. The discussion of FIG. 6 describes an example method for determining gain for patterned defect pixels.

As indicated at 740 of FIG. 7, for each patterned defect pixel, the pixel defect preprocessing component 606 of the sensor interface 302 may adjust the value of the pixel according to the respective determined gain value. The discussion of FIG. 6 describes an example method for applying the gain values determined at element 730 to the respective patterned defect pixels. In some embodiments, an offset for the patterned defect pixels may be used to correct for a pedestal or black level value that may be added by the image sensor. In some embodiments, a clip may be applied to the adjusted pixel values. Note that the values of normal pixels in the image are not affected.

As indicated at 750 of FIG. 7, the pixel defect preprocessing component 606 of the sensor interface 302 may provide the stream of pixel data with the values of the patterned defect pixels adjusted according to the determined gain values to one or more components of an image signal processor. For example, the pixel defect preprocessing component 606 may output the preprocessed pixels in the image with the values of the patterned defect pixels adjusted by the gain values to the ISP pipeline 400 for additional processing, and may also output the preprocessed pixels to memory (e.g., via direct memory access (DMA) technology), and/or to one or more other components or processes. The other components or processes may, for example, include an autofocus process, image statistics module(s) 304 that generate statistics for auto exposure, white balance, or other processes, and a process that detects key points in images (e.g., for use in facial recognition, computer vision, and/or image matching processes). In some embodiments, the sensor interface 302 may perform optional cropping and binning 608 and pixel offset scaling 612 to the output of the pixel defect preprocessing component 606 before sending the preprocessed image data to one or more of the downstream pipelines, components, or processes.

In some embodiments, the image signal processor 106 may include a pixel defect correction stage or component downstream of the sensor interface 302, for example at a raw processing stage 306 of the ISP pipeline 400 as illustrated in FIG. 4, that may receive the original pixels and/or the output pixels from the pixel defect preprocessing component 606 and perform a more rigorous correction of the patterned defect pixels than that performed by the pixel defect preprocessing component 606, as well as correction of other defective pixels in the image. Output of the pixel defect correction component may be of higher visual quality than the output of the pixel defect preprocessing component 606. However, in some embodiments, the pixel defect preprocessing component 606 may be simpler, faster, and may take up less real estate in the ISP 106 than the pixel defect correction component. Thus, the pixel defect preprocessing component 606 may output the image data with the adjusted patterned defect pixel values for use by image statistics module(s) 304 or other modules and/or pipelines 410 that may not require the image quality provided by the pixel defect correction component. Further, the pixel defect preprocessing component 606 may allow the image statistics module(s) 304 or other modules and/or pipelines 410 to process image pixel data more quickly and substantially in parallel with the ISP pipeline 400 processing, since the other modules or pipelines do not have to wait for the output of the pixel defect correction component to process the pixel data.

Pixel Defect Correction

Referring to FIG. 3, in some embodiments, an image signal processor 106 may include a pixel defect correction stage or component that may receive the original pixels and/or the output pixels from the pixel defect preprocessing component of the sensor interface 302 and perform a more rigorous correction of the patterned defect pixels than that performed by the pixel defect preprocessing component, as well as detection and correction of other defective pixels in the image. In some embodiments, the pixel defect correction component may be a component of the raw processing stage 306 of the image signal processor 106. In some embodiments, the pixel defect correction component may use a weighted combination of two or more neighboring pixels to correct the patterned defect pixels and other defective pixels. Output of the pixel defect correction component may thus be of higher visual quality than the output of the pixel defect preprocessing component.

Defective pixels on an image sensor fail to sense light levels correctly. There may be many different sources of defective pixels. For example, reset failure, high leakage, or other factors may cause a pixel to be brighter than a typical pixel given the same amount of light. As an example, a "hot" pixel has higher than normal charge leakage and may thus appear brighter than neighbor pixels. As another example, impurities, dust, circuit failures, or other factors can cause pixels to be darker or brighter than a typical pixel, or may cause a pixel to be stuck at a specific value regardless of the amount of light. For example, a "stuck" pixel is always fully charged and appears brighter, and a "dead" pixel is always off. Therefore, defective pixel detection should be robust to different failure scenarios.

In at least some embodiments of a pixel defect correction component, two types of defective pixel correction may be implemented: static defect correction where the locations of defective pixels are known a priori and loaded in a defect pixel location table, and dynamic defect correction where the locations of defective pixels are determined automatically for each frame. In addition, in some embodiments, patterned defect pixels such as focus pixels (see FIG. 5), if present, may also be identified and corrected. In some embodiments, when an input pixel is identified as a patterned defect pixel and is not in the defect pixel location table, the pixel is corrected by a patterned defect pixel correction component of the pixel defect correction component. If a patterned defect pixel is determined to be defective according to the defect pixel location table, the defective patterned defect pixel may be treated as a regular defect pixel and corrected by a dynamic defect pixel correction component of the pixel defect correction component. For other (normal) pixels, dynamic defect detection and defect pixel correction (if needed) may be applied by the defect pixel correction component of the pixel defect correction component.

Conventionally, defective pixels are identified either by a static defect table for the image sensor that identifies known defective pixels on the sensor, for example defective pixels determined by a calibration process for the image sensor at the factory, or are determined by dynamically identifying defective pixels in the current frame being processed.

In some embodiments, instead of simply relying on a predetermined static defect table and the current frame to determine defective pixels in a current frame being processed by the image processing pipeline, the pixel defect correction component tracks pixel defect history for the image sensor over multiple frames and applies the defect history when identifying defective pixels to be corrected in a current frame being processed. In some embodiments, the pixel defect correction component maintains a defect pixel location table that includes a defect confidence value for some or all of the pixels of the image sensor, including patterned defect pixels if present. The pixel defect correction component may dynamically identify defective pixels in each frame processed by the component, for example by comparing each pixel's value to the values of its neighbor pixels. If a pixel is dynamically detected as defective in a frame, its defect confidence value may be incremented in the defect pixel location table. Otherwise, if the pixel is detected as not being defective, the defect confidence value may be decremented for the pixel. In some embodiments, if a pixel's defect confidence value in the table is greater than or equal to a defect confidence threshold, the pixel defect correction component may consider the pixel defective and may thus apply a pixel defect correction technique to the pixel even if the pixel is not dynamically detected as defective. If a pixel's defect confidence value in the table is less than the defect confidence threshold, the pixel defect correction component may consider the pixel not defective and thus may not correct the pixel even if the pixel was detected as defective by the dynamic defect detection technique.

In some embodiments, the defect confidence value for a pixel may be incremented or decremented by 1. However, because some defective pixels may be detected as being defective only every few frames, in some embodiments, the defect confidence value for a pixel may be incremented by 2 or more, and decremented by a lesser amount (e.g., 1) to detect sometimes-defective pixels.

In some embodiments, the pixel defect correction component may apply defect confidence thresholds at different stages. In some embodiments, different thresholds may be used at different stages. For example, a defect replacement confidence threshold may be used at a static defect processing state in determining defective pixels to be replaced at that stage, and a defect correction confidence threshold may be used at a dynamic defect processing stage in determining pixels to be corrected at that stage. In some embodiments, the values of the defect replacement confidence threshold and the defect correction confidence threshold may be different. However, in some embodiments, the values of the thresholds may be the same. In some embodiments, the values of the defect confidence threshold(s) may be programmatically adjusted, for example to adapt static and/or dynamic defect detection so that fewer or more pixels are statically and/or dynamically detected as defective.

Figure 8:
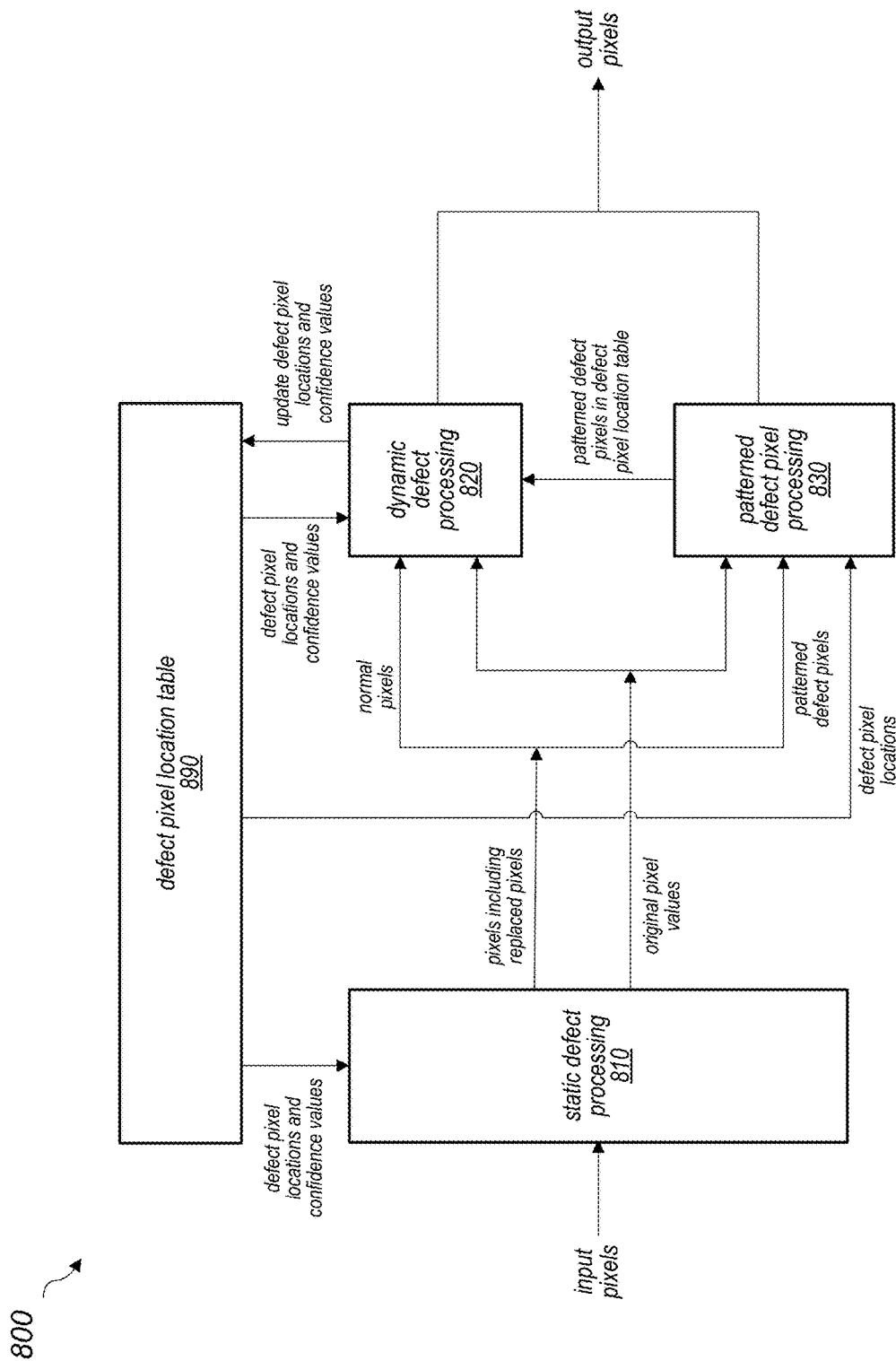
FIG. 8 is a logical block diagram illustrating components and operations of a pixel defect correction component of an image signal processor, according to some embodiments.

FIG. 8 is a logical block diagram illustrating components and operations of a pixel defect correction component 800 of an image signal processor 106, according to some embodiments. Pixel defect correction component 800 may, for example, be implemented at a raw processing stage 306 of an image signal processor 106 as illustrated in FIG. 3. In some embodiments, the pixel defect correction component 800 may include multiple stages or components. For example, as shown in FIG. 8, pixel defect correction component 800 may include, but is not limited to, a static defect preprocessing 810 stage or component, a dynamic defect processing 820 stage or component, and a patterned defect pixel processing 830 stage or component. Pixel defect correction component 800 may also include or have access to a defect pixel location table 890 that includes the locations and defect confidence values for pixels in image frames captured by image sensor(s) 102. In some embodiments, defect pixel location table 890 may be stored in an external memory (e.g., on the ISP 106). In some embodiments, the defect pixel location table 890 may be buffered to a local memory.

In some embodiments, the pixel defect detection and correction functionality implemented by pixel defect correction component 800 may require M horizontal x N vertical (e.g., 7x7) spatial support, as neighborhood pixels may be used in detecting and/or correcting defective pixels. Thus, while not shown in FIG. 8 for simplicity, pixel defect correction component 800 may implement M (e.g., 7) line buffers. In some embodiments, the line buffers may be shared by the dynamic defect processing 820 and the patterned defect pixel processing 830 components, thus saving real estate in the ISP 106.

Pixel defect correction component 800 may receive a stream of raw pixel data, for example from a sensor interface 302 as illustrated in FIGS. 3, 4, and 6. In some embodiments, the raw pixel data may have been preprocessed by the sensor interface 302, for example as described in reference to FIGS. 4 through 7. For each pixel, a static defect processing 810 component of the pixel defect correction component 800 may check defect pixel location table 890 to determine if the pixel is marked as defective. If the pixel is marked as defective and its defect confidence value is greater than or equal to a defect replacement confidence threshold, then the value of the pixel may be replaced with the value of a neighbor pixel, for example the value of the previous (left) pixel of the same color component (e.g., Gr, R, B, or Gb) in scan order as the pixels enter the pixel defect correction component 800. In some embodiments, if the defective pixel is on the left edge of the frame, it is instead replaced with a pixel value on a previously processed row, for example the value of the pixel of the same color component two rows above, unless the current pixel is also on the top edge of the frame, in which case the pixel value is not replaced. In some embodiments, the original value of the defective pixel may be stored, for example to a FIFO queue, for possible use in downstream components of the pixel defect correction component 800 (e.g., the dynamic defect processing 820 and the patterned defect pixel processing 830 components).

The pixels including the replacement values are output from the static defect processing 810 component to downstream components of the pixel defect correction component 800. Patterned defect pixels may first go to the patterned defect pixel processing 830 component. The other (normal) pixels go to the dynamic defect processing 820 component.

For each patterned defect pixel, the patterned defect pixel processing 830 component may check defect pixel location table 890 to determine if the patterned defect pixel is marked as defective in the table 890. If the patterned defect pixel is marked as defective, the pixel may be sent to the dynamic defect processing 820 component. Otherwise, the pixel value of the patterned defect pixel is corrected using a patterned defect pixel correction technique. For example, in some embodiments of a patterned defect pixel correction technique, the value of the patterned defect pixel is first replaced with a weighted combination of the pixel and its neighboring pixels of the same color component (e.g., Gr or Gb, as patterned defect pixels may all be green pixels). A weighted combination of the pixel and its neighboring pixels of all color components is then applied to the patterned defect pixel with the replaced value to produce the patterned defect pixel correction value. The weights for the weighted combination in both replacement and correction steps may, for example, be computed based on the pixel value and the values of its neighboring pixels. The corrected patterned defect pixel may then be output to a next stage or component of the image processing pipeline, for example in scan order with other corrected pixels and non-defective pixels.

As mentioned above, normal pixels output from the static defect processing 810 component go to the dynamic defect processing 820 component. In addition, patterned defect pixel marked as defective in the defect pixel location table 890 are sent to the dynamic defect processing 820 component. For each pixel, the dynamic defect processing 820 component applies a dynamic defect detection technique to determine if the pixel is defective. In some embodiments, a directional gradient technique using two or more neighbor pixels may be used as the dynamic defect detection technique. FIG. 11 illustrates example neighbor pixels for a current pixel P that may be used in a dynamic defect detection technique, according to some embodiments. Referring to FIG. 11, for the current pixel P, its eight immediate neighbors P0~P7 of the same color component in a 3×3 area may be used in the directional gradient technique. At the edge of the frame, pixels of the same color component are mirrored outside of the frame. Note that any of various other methods may be used to dynamically detect defective pixels. Also note that other neighborhoods (e.g., a 5×5 pixel neighborhood) may instead or also be used in some embodiments.

In some embodiments, after the dynamic defect processing 820 component applies the dynamic defect detection technique to the current pixel, the dynamic defect processing 820 component may update the defect pixel location table 890. In some embodiments, a defective pixel's location may be recorded in the table 890, if not already in the table 890. In some embodiments, if a pixel is detected as defective by the dynamic defect detection technique, its defect confidence value may be incremented in the defect pixel location table 890. Otherwise, if the pixel is detected as not being defective, the defect confidence value may be decremented for the pixel. In some embodiments, the defect confidence value for a pixel may be incremented or decremented by 1. However, because some defective pixels may be detected as being defective only sporadically and not every frame, in some embodiments, the defect confidence value for a pixel may be incremented by 2 or more, and decremented by a lesser amount (e.g., 1) to detect sometimes-defective pixels.

In some embodiments, after the dynamic defect processing 820 component updates the defect pixel location table 890 for the current pixel, the dynamic defect processing 820 component may check the defect confidence value for the pixel in the defect pixel location table 890. If the pixel's defect confidence value is greater than or equal to the defect correction confidence threshold, the pixel may be corrected using a defective pixel correction technique, for example using a weighted combination of two or more neighboring pixels, or using some other pixel correction technique. If the pixel's defect confidence value is less than the defect correction confidence threshold, the pixel's value may be replaced with the original pixel value stored by the static defect processing 810 component, if necessary. The pixel may then be output to a next stage or component of the image processing pipeline, or to two or more stages or components, for example in scan order with other corrected pixels and non-defective pixels.

In some embodiments, the dynamic defect detection technique may generate confidence values when detecting defective pixels. In some embodiments, a combination of these confidence values and the defect confidence values from the defect pixel location table 890 may be compared to the defect correction confidence threshold to determine which pixels are to be corrected by the defective pixel correction technique.

In some embodiments, at least some of the pixels processed by the pixel defect correction component 800 may instead or also be written out to a memory, for example according to DMA technology. In some embodiments, for example, the patterned defect pixels may be output to memory via DMA technology. In some embodiments, the pixel defect correction component 800 may include a defect statistics component or module (not shown) that may receive defect information from the dynamic defect processing 820 stage or component and generate and output (e.g., to a memory via DMA technology) defect statistics for at least some processed image frame(s).

In some embodiments, at least some of the stages or components of the pixel defect correction component 800 may be programmatically controlled by external hardware and/or software components of the ISP 106, SOC 104, and/or device in which the ISP 106 is implemented, for example by a central control module 320 of the ISP 106 or an image capture application on the device. For example, one or more of the stages or components of the pixel defect correction component (e.g., components 810, 820, or 830) may be enabled or disabled via external input. As a non-limiting example, the dynamic defect processing 820 component may be controlled by external software and/or hardware to operate only on every Nth frame, or to be disabled during certain image capture conditions. For example, in some embodiments, motion data collected by orientation sensor(s) 134 as illustrated in FIG. 1 may be used to detect when the device is in a fixed position or is moving, and this information may be used by hardware and/or software to disable the defect confidence value increment and/or decrement for at least some frames captured while the device is in a fixed position. This may, for example, help prevent the dynamic defect processing 820 component from tagging pixels that are capturing local highlights (e.g., bright Christmas lights in a night scene) as defective when the camera is being held still or is mounted and is capturing multiple frames of the same scene. As another example, in some embodiments, the central control module 320 of the ISP 106 or some other component of the SOC may monitor and modify the defect pixel location table 890. For example, the central control module 320 or some other component may track defective pixels as detected by the pixel defect correction component 800 over longer time frames than are tracked by the pixel defect correction component 800, and may mark pixels that are historically determined to be defective as permanently defective (e.g., the pixel is a stuck or dead pixel, or a hot or cold defect pixel), for example by setting their defect confidence value in the defect pixel location table 890 to a value that is not dynamically updated by the dynamic defect detection and correction component of the pixel defect correction component 800. Pixels thus marked may be considered as permanently defective; these pixels may be corrected, but the defect confidence value for these pixels is not dynamically updated.

Figure 9:
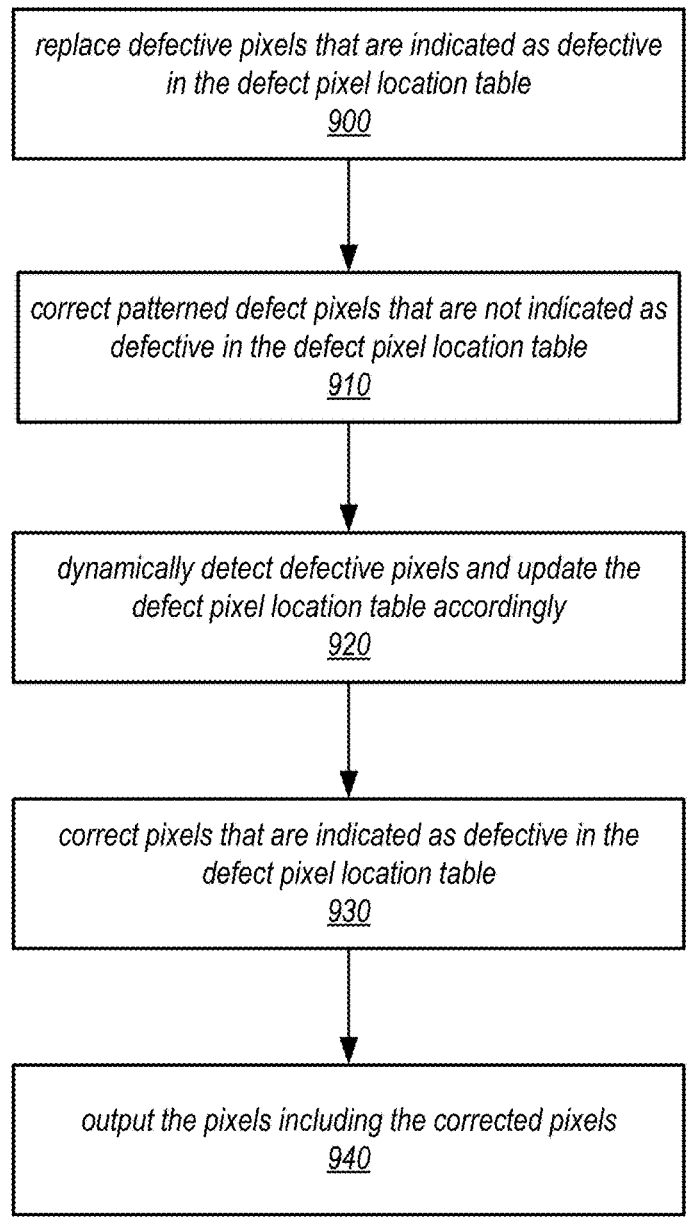
FIG. 9 is a high-level flowchart illustrating a method for detecting and correcting defective pixels, according to some embodiments.

FIG. 9 is a high-level flowchart illustrating a method for detecting and correcting defective pixels, according to some embodiments. The method FIG. 9 may, for example, be implemented by a pixel defect correction component 800 as illustrated in FIG. 8.

As indicated at 900 of FIG. 9, pixel defect correction component 800, for example a static defect processing 810 component, may replace defective pixels that are indicated as defective in the defect pixel location table. In some embodiments, only pixels for which the defect confidence value exceeds the defect replacement confidence threshold are replaced. In some embodiments, the defective pixels are replaced with the value of a neighbor pixel of the same color component. In some embodiments, the original pixel value is saved for the defective pixels.

As indicated at 910 of FIG. 9, pixel defect correction component 800, for example a patterned defect pixel processing 830 component, may correct patterned defect pixels that are not indicated as defective in the defect pixel location table. A patterned defect pixel correction technique may be used to correct the patterned defect pixels, for example a two-step technique that replaces and corrects the value of the patterned defect pixel with the value of a weighted combination of the pixel value and the values of two or more neighbor pixels in both steps. Patterned defect pixels that are indicated as defective in the defect pixel location table may be passed to the dynamic defect processing 820 component.

As indicated at 920 of FIG. 9, pixel defect correction component 800, for example a dynamic defect processing 820 component, may dynamically detect defective pixels and update the defect pixel location table accordingly. For example, defect pixel locations may be added or removed, and the defect confidence value in the defect pixel location table may be updated (incremented or decremented) for at least some pixels based on results of a dynamic defect detection technique applied by the dynamic defect processing 820 component.

As indicated at 930 of FIG. 9, pixel defect correction component 800, for example a dynamic defect processing 820 component, may correct pixels that are indicated as defective in the updated defect pixel location table using a defective pixel correction technique, for example a technique that updates or replaces the value of the defective pixel with a weighted combination of values of two or more neighbor pixels. In some embodiments, speckle pixels may also be detected, and the speckle pixels that are not determined to be highlights in the current image may also be corrected using the defective pixel correction technique.

As indicated at 940 of FIG. 9, pixel defect correction component 800 may output the pixels including the corrected pixels. For example, the pixels may be output to a next stage or component of an image processing pipeline 400, for example in scan order with other corrected pixels and non-defective pixels, or may be written to a memory, for example using DMA technology.

The method of FIG. 9 may be performed for the pixels of each frame captured by an image sensor, or alternatively dynamically updating the defect pixel location table, or both dynamic detection and the defect table update, as described at element 920 may only be performed for some of the frames. The defect pixel location table is updated when element 920 is applied, and the updated table is used when detecting and correcting defective pixels in at least some subsequent frames. Thus, the defect pixel location table provides a history of pixel defects over time, and indications of defective pixels can be added to or removed from the table. Thus, rather than relying on a static defect table as in conventional systems, embodiments provide a dynamic defect table that is adapted over time to the conditions of the image sensor, with pixels that become defective being detected and marked as defective in the table, and pixels that are actually not defective being detected and removed or marked as not defective in the table.

Figure 10A:
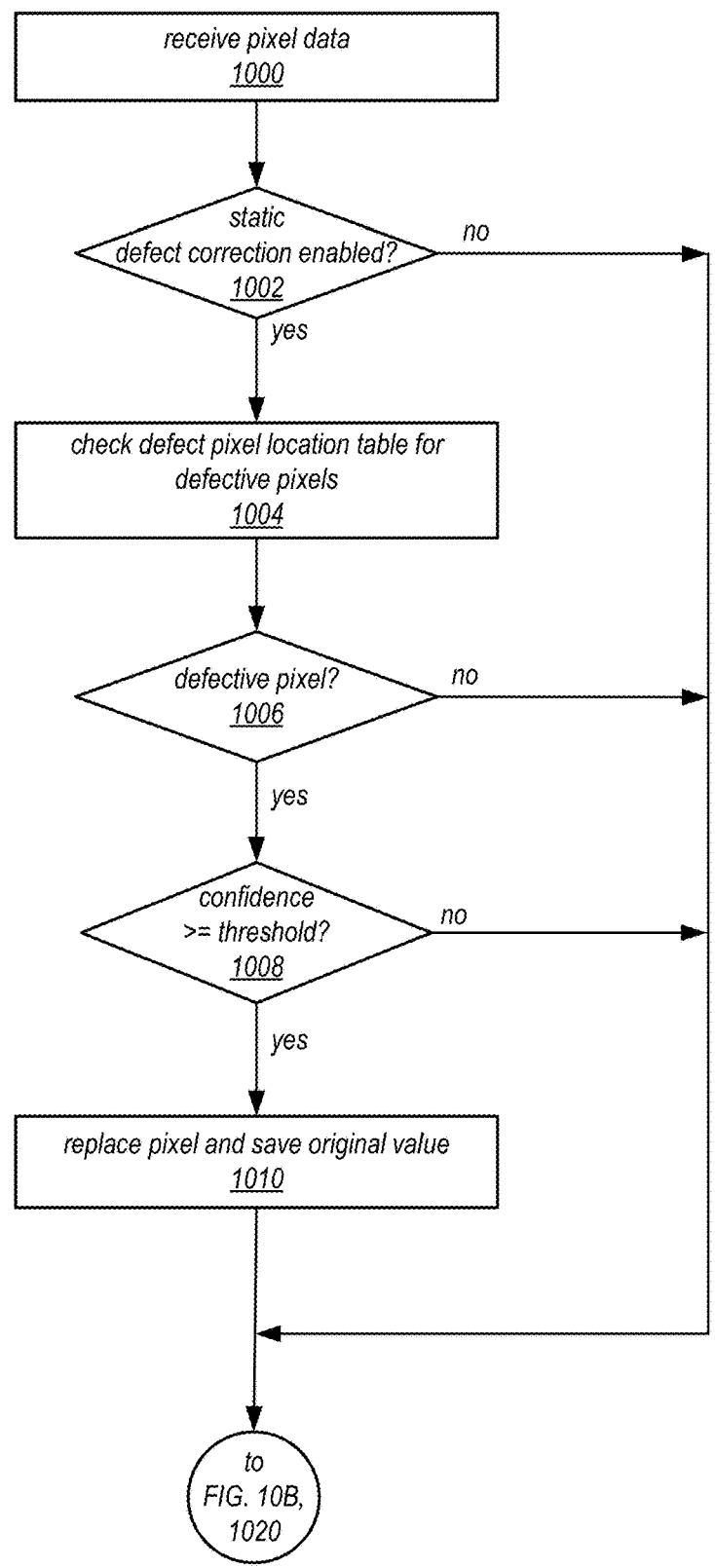
FIGS. 10A and 10B provide a more detailed flowchart illustrating a method for detecting and correcting defective pixels, according to some embodiments.
Figure 10B:
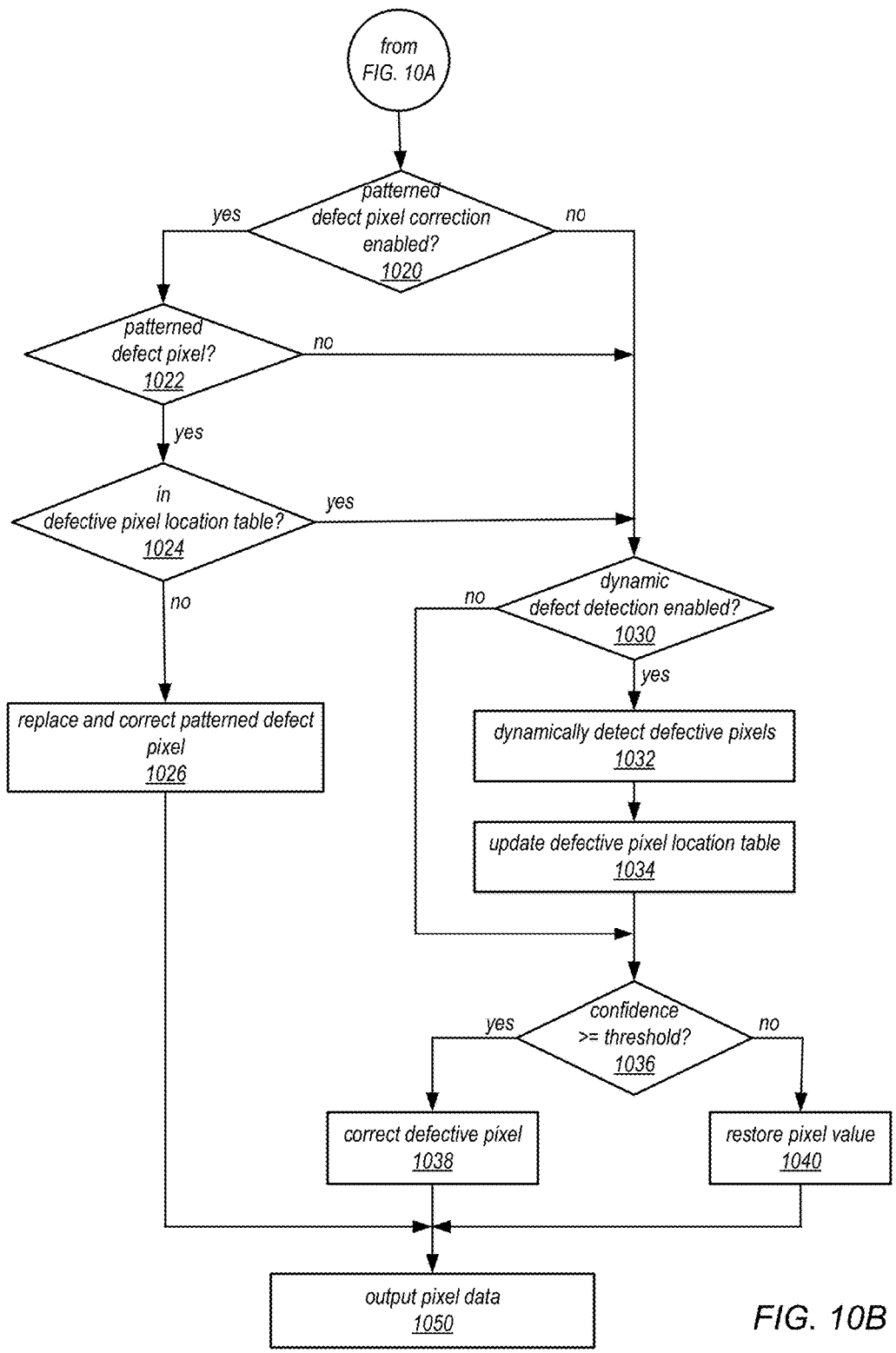

FIGS. 10A and 10B provide a more detailed flowchart illustrating a method for detecting and correcting defective pixels based at least in part on defect pixel history, according to some embodiments of an image processing pipeline. The method of FIGS. 10A and 10B may, for example, be implemented by a pixel defect correction component 800 as illustrated in FIG. 8.

FIG. 10A illustrates a method for statically detecting and correcting defective pixels, according to some embodiments. At least some of the elements of FIG. 10A may be implemented by a static defect processing stage or component 810 of a pixel defect correction component 800 as illustrated in FIG. 8. As indicated at 1000 of FIG. 10A, pixel defect correction component 800 may receive pixel data. For example, pixel defect correction component 800 may receive a stream of raw pixel data, for example from a sensor interface 302 as illustrated in FIGS. 3, 4, and 6. In some embodiments, the raw pixel data may have been preprocessed by the sensor interface 302, for example as described in reference to FIGS. 4 through 7.

At 1002 of FIG. 10A, status of a static defect correction enable/disable switch or flag may be checked. If static defect correction is enabled, then the method proceeds to element 1004 of FIG. 10A. If static defect correction is not enabled, then elements 1004 through 1010 of FIG. 10A are not performed, and the method may proceed to element 1020 of FIG. 10B.

As indicated at 1004 of FIG. 10A, the defect pixel location table 890 may be checked for defective pixels. In some embodiments, for each pixel, the static defect processing 810 component may check the defect pixel location table 890 to determine if the pixel is marked as defective. At 1006 of FIG. 10A, if the pixel is marked as defective in the table 890, then the method proceeds to element 1008 of FIG. 10A. If the pixel is not marked as defective in the table 890, then the method proceeds to element 1020 of FIG. 10B.

At 1008 of FIG. 10A, the current defect confidence value for the pixel may be checked against the defect replacement confidence threshold. If the pixel's defect confidence value is greater than or equal to the defect replacement confidence threshold, then the method proceeds to perform element 1010 of FIG. 10A. If the pixel's defect confidence value is smaller than the defect replacement confidence threshold, then the method proceeds to element 1020 of FIG. 10B without performing element 1010.

As indicated at 1010 of FIG. 10A, the value of the pixel may be replaced, for example with the value of a neighbor pixel, for example the value of the previous (left) pixel of the same color component (e.g., Gr, R, B, or Gb) in scan order as the pixels are received at element 1000. The pixel's replacement value is forwarded to element 1020 of FIG. 10B to be processed. In some embodiments, if the defective pixel is on the left edge of the frame, it is instead replaced with a pixel value on a previously processed row, for example the value of the pixel of the same color component two rows above, unless the current pixel is also on the top edge of the frame, in which case the pixel value is not replaced. In some embodiments, the original value of the defective pixel may be stored, for example to a FIFO queue; the original pixel value may be used at one or more of the elements in FIG. 10B.

FIG. 10B illustrates methods for dynamically detecting and correcting defective pixels and for detecting and correcting patterned defect pixels, according to some embodiments. At least some of the elements of FIG. 10B may be implemented by the dynamic defect processing 820 and the patterned defect pixel processing 830 components of a pixel defect correction component 800 as illustrated in FIG. 8. For example, elements 1022 through 1026 of FIG. 10B may be implemented by the patterned defect pixel processing 830 component, and elements 1030 through 1040 may be implemented by the dynamic defect processing 820 component.

At 1020 of FIG. 10B, current status of a patterned defect pixel correction enable/disable switch or flag may be checked. If patterned defect pixel correction is enabled, then the method proceeds to element 1022 of FIG. 10B. Otherwise, the method proceeds to element 1030 of FIG. 10B.

At 1022 of FIG. 10B, the location of the current pixel may be checked to determine if the pixel is a patterned defect pixel, for example as illustrated in FIG. 5. If the current pixel is a patterned defect pixel, then the method proceeds to element 1024 of FIG. 10B. Otherwise, the method proceeds to element 1030 of FIG. 10B.

At 1024 of FIG. 10B, the defective pixel location table 890 may be checked for the current pixel to determine if the pixel is marked as defective in the table. If the pixel is marked as defective in the defective pixel location table, then the method proceeds to element 1030 of FIG. 10B. Otherwise, the method proceeds to element 1026 of FIG. 10B.

As indicated at 1026 of FIG. 10B, the patterned defect pixel may be replaced and corrected. In some embodiments, the pixel value of the patterned defect pixel is first replaced with the value of a weighted combination of the pixel and its neighboring pixels of the same color component (e.g., Gr or Gb, as patterned defect pixels may all be green pixels). The patterned defect pixel is then corrected using the replaced value, for example using a weighted combination of the replaced value and neighboring pixels of all color components. The corrected patterned defect pixel may then be output 1050 to a next stage or component of the image processing pipeline, for example in scan order with other corrected pixels and non-defective pixels.

In some embodiments, pixels processed by the static defect processing 810 component as illustrated in FIG. 10A may be sent to the dynamic defect processing 820 component for processing. In addition, patterned defect pixels marked as defective in the defect pixel location table 890 at element 1024 of FIG. 10B may be sent to the dynamic defect processing 820 component for processing. At 1030 of FIG. 10B, current status of a dynamic defect detection enable/disable switch or flag may be checked. If dynamic defect detection is enabled, then the method proceeds to perform elements 1032 and 1034. Otherwise, elements 1032 and 1034 are skipped, and the method proceeds to element 1036. While not shown in FIG. 10B, in some embodiments, for some frames processed by the ISP 106, element 1032 (dynamic defect detection) may be performed, but element 1034 (update of the defective pixel location table 890) may be skipped. In addition, in some embodiments, for some pixels processed by the pixel defect correction component 800 (e.g., pixels marked as permanently defective in the table), element 1032 (dynamic defect detection) may be (but is not necessarily) performed, but element 1034 (update of the defective pixel location table 890 for the pixel) may be skipped.

As indicated at 1032 of FIG. 10B, a dynamic defect detection technique may be applied to dynamically detect defective pixels. In some embodiments, for each pixel, the dynamic defect processing 820 component applies a dynamic defect detection technique to determine if the pixel is defective. In some embodiments, a directional gradient technique using two or more neighbor pixels may be used at element 1032 as the dynamic defect detection technique. FIG. 11 illustrates example neighbor pixels for a current pixel P that may be used in a dynamic defect detection technique, according to some embodiments. Referring to FIG. 11, for the current pixel P, its eight immediate neighbors P0~P7 of the same color component in a 3×3 area may be used in the directional gradient technique. At the edge of the frame, pixels of the same color component are mirrored outside of the frame. Note that any of various other methods may be used at element 1032 to dynamically detect defective pixels. Also note that other neighborhoods (e.g., a 5×5 pixel neighborhood) may instead or also be used in some embodiments.

As indicated at 1034 of FIG. 10B, the defective pixel location table 890 may be updated. In some embodiments, after the dynamic defect processing 820 component applies the dynamic defect detection technique to the current pixel at element 1032 of FIG. 10B, the dynamic defect processing 820 component may update the defect pixel location table 890 for the pixel. In some embodiments, a defective pixel's location may be recorded in the table 890, if not already in the table 890. In some embodiments, if a pixel is detected as defective by the dynamic defect detection technique, its defect confidence value may be incremented in the defect pixel location table 890. Otherwise, if the pixel is detected as not being defective, the defect confidence value may be decremented for the pixel. In some embodiments, the defect confidence value for a pixel may be incremented or decremented by 1. However, because some defective pixels may be detected as being defective only sporadically and not every frame, in some embodiments, the defect confidence value for a pixel may be incremented by 2 or more, and decremented by a lesser amount (e.g., 1) to detect sometimes-defective pixels.

At 1036 of FIG. 10B, the current defect confidence value for the pixel may be checked against the defect correction confidence threshold. If the pixel's defect confidence value is greater than or equal to the defect correction confidence threshold, the method may proceed to element 1038 of FIG. 10B. Otherwise, the method may proceed to element 1040 of FIG. 10B. Note that, in some embodiments, element 1036 may be skipped for some pixels so that the pixels are always corrected if determined to be permanently defective in the defect pixel location table 890.

As indicated at 1038 of FIG. 10B, if the pixel's defect confidence value is greater than or equal to the defect correction confidence threshold, then the pixel may be corrected using a defective pixel correction technique, for example using a weighted combination of two or more neighboring pixels of the same color component, or using some other pixel correction technique. The method then proceeds to element 1050. As indicated at 1040 of FIG. 10B, if the pixel's defect confidence value is less than the defect correction confidence threshold, the pixel's value may be replaced with the original pixel value saved at element 1010 of FIG. 10A, if necessary. The method then proceeds to element 1050.

As indicated at 1050 of FIG. 10B, the pixel defect correction component 800 may output the pixel data including the corrected pixels. The pixel data may be output to a next stage or component of the image processing pipeline, or to two or more stages or components, for example in scan order. In some embodiments, at least some of the pixels processed by the pixel defect correction component 800 may instead or also be written out to a memory, for example according to DMA technology.

Embodiments of the pixel defect correction component 800 as described above may maintain, update, and apply a history of defective pixels over many image or video frames captured by an image sensor by updating and applying the defect confidence values in the table 890 for the pixels in the frames to more effectively detect and correct defective pixels in the frames than can typically be done by conventional methods that identify defective pixels either by a static defect table for the image sensor that identifies known defective pixels on the sensor or by dynamically identifying defective pixels in the current frame being processed. In embodiments, if a pixel on the image sensor that may not have been marked as defective in the defect pixel location table is or has become defective, or is sometimes defective, its defect confidence value will become high over time, and thus the pixel may be determined and marked to be defective and may be corrected. In addition, pixels that may have been marked as defective may be determined by the method over time to be not defective as its defect confidence value is decremented.

In some embodiments, as the history of defective pixels builds up over many captured and processed frames, confidence in the defect pixel location table 890 may increase. Thus, the pixel defect correction component 800 may, over time, come to rely more on the static defect preprocessing 810 stage or component to detect and correct defective pixels, and less on the dynamic defect processing 820 stage or component. For example, the pixel defect correction component 800 may perform dynamic defect processing 820 less often as its confidence in the table 890 increases over time.

Speckle and Highlight Detection

In some embodiments, the pixel defect correction component 800 may detect and correct speckles in the frames, for example at the dynamic defect processing 820 stage. A speckle may be defined as a pixel for which the pixel value is some amount (e.g., a speckle threshold) over (or under) the values (e.g., the average values) of its neighbor pixels of the same color component. Pixels detected as being speckles may be corrected in the same or similar manner as pixels detected to be defective at the dynamic defect processing 820 stage.

In some embodiments, the values of neighbor pixels of a pixel detected as a bright speckle or bright dynamic defect may be checked against the value of values (e.g., the average values) of their own neighboring pixels of the same color component. If the values of one or more of the pixels is some amount (e.g., a highlight threshold) over the values (e.g., the average values) of their own neighboring pixels of the same color component, then the bright speckle or bright dynamic defect pixel may be determined to be part of a highlight (e.g., a bright point of light in the scene captured by two or more pixels of the image sensor, such as a Christmas light in a night scene) and thus may not be corrected.

Pixel Popping Detection and Correction

In some embodiments, at the dynamic defect processing 820 stage, if a pixel is dynamically determined to be defective, e.g. is brighter than its neighbors by a certain value, then its defect confidence value may be incremented. However, the pixel may not be corrected unless its updated defect confidence value is over the defect correction confidence threshold. In some embodiments, a popping pixel detection technique may be applied to at least some of the pixels in the stream to detect popping pixels in the stream. In the popping pixel detection technique, if the pixel is a lot brighter (e.g., over a bright "popping" threshold) than its neighboring pixels but is not determined to be a highlight, then the pixel may be determined to be "popping" bright, and even though its defect confidence value is not at or above the defect correction confidence threshold, the pixel may be corrected. In some embodiments, if a pixel is determined to be a lot darker (e.g., under a dark "popping" threshold) than its neighboring pixels, then the pixel may be determined to be "popping" dark, and even though its defect confidence value is not at or above the defect correction confidence threshold, the pixel may be corrected.

In some embodiments of the popping pixel detection technique a dark popping pixel is detected as a dark pixel for which a difference between the value of the pixel and a minimum value (or second lowest minimum value) of its neighboring pixels or an average value of two or more of its neighboring pixels exceeds a dark popping threshold. A bright popping pixel is detected a bright pixel for which a difference between the value of the pixel and a maximum value of its neighboring pixels (or second highest maximum value) or an average value of two or more of its neighboring pixels exceeds a bright popping threshold. In some embodiments, one of two or more minimum values (e.g., a lowest minimum value and a second lowest minimum value) and one of two or more maximum values (e.g., a highest maximum value and a second highest maximum value) may be used, and the value to which pixels are compared to detect "popping" pixels (e.g., the lowest minimum value, the second lowest minimum value, or the average value of two or more neighboring pixels for dark popping pixels) may be programmatically determined.

Crosstalk Compensation

In some embodiments, the pixel defect correction component 800 may perform crosstalk compensation on at least some pixels in a frame. In some embodiments, crosstalk compensation may be performed in two phases: an initial phase, performed before patterned defect pixel processing 820 and dynamic defect processing 830, and a second phase, performed in parallel with patterned defect pixel processing 820 and dynamic defect processing 830. If the frame includes patterned defect pixels, the crosstalk to its neighbor pixels may be different than the crosstalk to neighbor pixels of normal pixels. Thus a different crosstalk compensation technique may be applied to compensate for crosstalk to neighbor pixels of the patterned defect pixels than is applied to the neighbors of normal pixels. In some embodiments, all patterned defect pixels are green pixels, and crosstalk compensation is applied to each patterned defect pixel's four immediate red and blue neighbor pixels.

What is claimed is:

1. An apparatus, comprising:
an image sensor configured to capture frames, wherein each frame is captured as a plurality of pixels;
an image signal processor comprising a pixel defect correction component, the pixel defect correction component configured to receive a stream of pixel data for a frame captured by the image sensor;
wherein the pixel defect correction component comprises a dynamic defect processing component configured to:
apply a dynamic defect detection technique to at least some of the pixels in the stream to detect defective pixels in the stream, wherein the dynamic defect detection technique is configured to detect defects for a plurality of pixel failure scenarios, and wherein pixels are detected as defective according to two or more of the plurality of pixel failure scenarios;
for pixels detected as defective by the dynamic defect detection technique, increment a defect confidence value for the pixel in a defect pixel location table for the image sensor;
for pixels detected as not defective by the dynamic defect detection technique, decrement the defect confidence value for the pixel in the defect pixel location table, wherein for at least one of the pixels detected as not defective by the dynamic defect detection technique the decremented defect confidence value for the pixel exceeds a defect correction confidence threshold;
compare the updated defect confidence values for the pixels to the defect correction confidence threshold; and
for at least one pixel for which the respective updated defect confidence value is at or above the defect correction confidence threshold, apply a defective pixel correction technique to the pixel to correct the value of the pixel; and wherein the pixel defect correction component is further configured to provide the stream of pixel data with the corrected values of the at least one pixel to other components of the image signal processor for additional processing.

2. The apparatus as recited in claim 1, wherein the pixel defect correction component further comprises a static defect processing component configured to, prior to the dynamic defect processing component applying the dynamic defect detection technique:
  check the defect pixel location table to determine pixels in the stream that are marked as defective in the table;
  for the pixels in the stream that are marked as defective in the table and for which the respective defect confidence value is at or above a defect replacement confidence threshold, store an original value of the pixel and replace the value of the pixel with a value of a neighbor pixel of a same color component; and
  provide the stream of pixel data including the pixels with the replaced values to the dynamic defect processing component.

3. The apparatus as recited in claim 1, wherein the stream of pixel data includes patterned defect pixels for the frame, wherein the patterned defect pixels are pixels on the image sensor that intentionally captured differently than normal pixels by the image sensor, and wherein the pixel defect correction component further comprises a patterned defect pixel processing component configured to:
  check the defect pixel location table to determine patterned defect pixels in the stream that are marked as defective in the table;
  provide the patterned defect pixels in the stream that are marked as defective in the table to the dynamic defect processing component; and
  for at least one patterned defect pixel in the stream that is not marked as defective in the table, correct the value of the patterned defect pixel according to a patterned defect pixel correction technique.

4. The apparatus as recited in claim 1, wherein the dynamic defect detection technique applies a directional gradient using two or more neighbor pixels of a current pixel being processed by the dynamic defect processing component to detect defective pixels, and wherein the defective pixel correction technique uses a weighted combination of values of two or more neighbor pixels to correct the value of the defective pixels.

5. The apparatus as recited in claim 1, wherein the pixel defect correction component receives the stream of pixel data from a sensor interface of the image signal processor, wherein the sensor interface is configured to:
  receive a stream of raw pixel data from the image sensor;
  determine and apply gain values to patterned defect pixels in the stream of raw pixel data to adjust the values of the patterned defect pixels, wherein the patterned defect pixels are pixels on the image sensor that are intentionally captured differently than normal pixels by the image sensor; and
  provide the stream of raw pixel data with the adjusted values of the patterned defect pixels to one or more other components of the image signal processor for additional processing.

6. The apparatus as recited in claim 1, wherein the apparatus comprises a mobile computing device.

7. A method, comprising:
  receiving, at a pixel defect correction component of an image signal processor, a stream of pixel data collected from an image sensor;
  applying, by a dynamic defect processing component of the pixel defect correction component, a dynamic defect detection technique to at least some of the pixels in the stream to detect defective pixels in the stream, wherein the dynamic defect detection technique is configured to detect defects for a plurality of pixel failure scenarios, and wherein pixels are detected as defective according to two or more of the plurality of pixel failure scenarios;
  incrementing a defect confidence value in a defect pixel location table for pixels detected as defective by the dynamic defect detection technique;
  decrementing the defect confidence value in the defect pixel location table for pixels detected as not defective by the dynamic defect detection technique, wherein for at least one of the pixels detected as not defective by the dynamic defect detection technique the decremented defect confidence value for the pixel exceeds a defect correction confidence threshold;
  comparing the updated defect confidence values for the pixels to the defect correction confidence threshold;
  applying, by the dynamic defect processing component, a defective pixel correction technique to at least some pixels for which the respective updated defect confidence value is at or above the defect correction confidence threshold to correct the values of the respective pixels; and
  providing the stream of pixel data with the corrected values to one or more other components of the image signal processor for additional processing.

8. The method as recited in claim 7, further comprising, prior to applying the dynamic defect detection technique:
  checking, by a static defect processing component of the pixel defect correction component, the defect pixel location table to determine pixels in the stream that are marked as defective in the table;
  for the pixels in the stream that are marked as defective in the table and for which the respective defect confidence value is at or above a defect replacement confidence threshold, storing an original value of the pixel and replacing the value of the pixel with a value of a neighbor pixel of a same color component; and
  providing the stream of pixel data including the pixels with the replaced values to the dynamic defect processing component.

9. The method as recited in claim 8, further comprising replacing, by the dynamic defect processing component, the value of pixels for which the respective updated defect confidence value is below the defect correction confidence threshold with the stored original value of the pixel.

10. The method as recited in claim 7, wherein the stream of pixel data includes patterned defect pixels, wherein the patterned defect pixels are pixels on the image sensor that are intentionally captured differently than normal pixels by the image sensor, the method further comprising:
  checking, by a patterned defect pixel processing component of the pixel defect correction component, the defect pixel location table to determine patterned defect pixels in the stream that are marked as defective in the table;
  providing the patterned defect pixels in the stream that are marked as defective in the table to the dynamic defect processing component; and
  correcting, by the patterned defect pixel processing component, the value of patterned defect pixels in the stream that are not marked as defective in the table according to a patterned defect pixel correction technique.

11. The method as recited in claim 10, wherein the patterned defect pixel correction technique replaces the value of a current patterned defect pixel with a weighted combination of the pixel value and the values of one or more neighbor pixels of a same color component and applies a weighted combination of values of two or more neighbor pixels and the replaced value to correct the value of the current patterned defect pixel.

12. The method as recited in claim 7, wherein the dynamic defect detection technique applies a directional gradient using two or more neighbor pixels of a current pixel being processed by the dynamic defect processing component to detect if the current pixel is defective, and wherein the defective pixel correction technique applies a weighted combination of values of two or more neighbor pixels to correct the value of a current pixel.

13. The method as recited in claim 7, further comprising:
applying a speckle detection technique to at least some of the pixels in the stream to detect speckle pixels in the stream, wherein a speckle pixel is a pixel for which a difference between the value of the pixel and an average value of its neighboring pixels exceeds a speckle threshold;
for pixels detected as speckle pixels, checking the values of one or more neighboring pixels of the speckle pixel against the values of two or more of their own neighboring pixels of a same color component to determine if the pixel is part of a highlight in an image of a scene captured by the image sensor; and
applying, by the dynamic defect processing component, the defective pixel correction technique to the speckle pixels that are not determined to be part of a highlight.

14. The method as recited in claim 7, further comprising, after said applying the dynamic defect detection technique:
applying a popping pixel detection technique to at least some of the pixels in the stream to detect popping pixels in the stream, wherein a dark popping pixel is a dark pixel for which a difference between the value of the pixel and one of a lowest minimum value, a second lowest minimum value, or an average value of two or more of its neighboring pixels exceeds a dark popping threshold, and wherein a bright popping pixel is a bright pixel for which a difference between the value of the pixel and one of a highest maximum value, a second highest maximum value, or an average value of two or more of its neighboring pixels exceeds a bright popping threshold;
for pixels detected as bright popping pixels, checking the values of one or more neighboring pixels of the bright popping pixel against the values of two or more of their own neighboring pixels to determine if the pixel is part of a highlight in an image of a scene captured by the image sensor; and
applying the defective pixel correction technique to the dark popping pixels and to the bright popping pixels that are not determined to be part of a highlight.

15. The method as recited in claim 7, wherein the image signal processor is implemented as part of a mobile computing device.

16. A system, comprising:
a computing device configured to perform image processing, the computing device comprising a static defect processing component and a dynamic defect processing component;

wherein the static defect processing component is implemented by one or more processors and configured to:
check a defect pixel location table to determine pixels in a stream of pixel data that are marked as defective in the table, wherein the defect pixel location table indicates locations of and defect confidence values for at least some pixels of an image sensor;
replace the value of pixels in the stream that are marked as defective in the table and for which a respective defect confidence value is at or above a defect replacement confidence threshold with a value of a neighbor pixel of a same color component; and
provide the stream of pixel data including the pixels with the replaced values to the dynamic defect processing component;
wherein the dynamic defect processing component is implemented by one or more processors and configured to:
apply a dynamic defect detection technique to at least some of the pixels in the stream to detect defective pixels in the stream, wherein the dynamic defect detection technique is configured to detect defects for a plurality of pixel failure scenarios, and wherein pixels are detected as defective according to two or more of the plurality of pixel failure scenarios;
increment the defect confidence value in the defect pixel location table for pixels detected as defective by the dynamic defect detection technique
decrement the defect confidence value in a defect pixel location table for pixels detected as not defective by the dynamic defect detection technique, wherein for at least one of the pixels detected as not defective by the dynamic defect detection technique the decremented defect confidence value for the pixel exceeds a defect correction confidence threshold;
compare the updated defect correction confidence values for the pixels to the defect correction confidence threshold; and
apply a defective pixel correction technique to pixels for which the respective updated defect confidence value is at or above the defect correction confidence threshold to correct the values of the respective pixels.

17. The system as recited in claim 16, wherein the static defect processing component is further configured to store an original value of pixels that are replaced, and wherein the dynamic defect processing component is further configured to replace the value of pixels for which the respective updated defect confidence value is below the defect correction confidence threshold with the stored original value of the pixel.

18. The system as recited in claim 16, wherein the stream of pixel data includes patterned defect pixels, wherein the patterned defect pixels are pixels on the image sensor that are intentionally captured differently than normal pixels by the image sensor, and wherein the device further comprises a patterned defect pixel processing component configured to:
receive the stream of pixel data including the pixels with the replaced values from the static defect processing component;
check the defect pixel location table to determine patterned defect pixels in the stream that are marked as defective in the table;
provide the patterned defect pixels in the stream that are marked as defective in the table to the dynamic defect processing component; and correct the value of patterned defect pixels in the stream that are not marked as defective in the table according to a patterned defect pixel correction technique.

19. The system as recited in claim 18, wherein the computing device further comprises a sensor interface configured to:
- receive a stream of raw pixel data collected by the image sensor;
- initially adjust values of the patterned defect pixels according to determined gain values; and
- provide the stream of raw pixel data with the adjusted values of the patterned defect pixels to one or more other components of the device, wherein the one or more other components include the static defect processing component.

20. The system as recited in claim 16, wherein the system is a mobile computing device, wherein the computing device is an image signal processor, and wherein the static defect processing component and the dynamic defect processing component are components of an image processing pipeline of the image signal processor.

* * * * *